(12) United States Patent
Ha et al.

(10) Patent No.: US 12,438,738 B2
(45) Date of Patent: Oct. 7, 2025

(54) ELECTRONIC DEVICE AND METHOD FOR SHARING DATA USING BLOCKCHAIN NETWORK

(71) Applicant: SAMSUNG ELECTRONICS CO., LTD., Suwon-si (KR)

(72) Inventors: Seungmin Ha, Suwon-si (KR); Kyeongmin Kang, Suwon-si (KR); Sinae Lee, Suwon-si (KR); Moonkyu Kim, Suwon-si (KR); Yongjoon Kim, Suwon-si (KR); Younghwan Ryu, Suwon-si (KR); Seongryeol Ma, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 155 days.

(21) Appl. No.: 18/138,529

(22) Filed: Apr. 24, 2023

(65) Prior Publication Data
US 2023/0261886 A1    Aug. 17, 2023

Related U.S. Application Data

(63) Continuation of application No. PCT/KR2021/017656, filed on Nov. 26, 2021.

(30) Foreign Application Priority Data

Nov. 26, 2020  (KR) ......................... 10-2020-0161727

(51) Int. Cl.
*H04L 9/00* (2022.01)
*G06F 21/10* (2013.01)
(Continued)

(52) U.S. Cl.
CPC ................ *H04L 9/50* (2022.05); *G06F 21/10* (2013.01); *H04L 9/30* (2013.01); *H04L 9/3247* (2013.01)

(58) Field of Classification Search
CPC . H04L 9/50; H04L 9/30; H04L 9/3247; G06F 21/10; H04N 7/16
(Continued)

(56) References Cited

U.S. PATENT DOCUMENTS 11,157,876 B1    10/2021 Knas et al.
2018/0302215 A1    10/2018 Salgueiro et al.
(Continued)

FOREIGN PATENT DOCUMENTS

EP    3 695 339 A1    8/2020
KR    10-2018-0112027 A    10/2018
(Continued)

OTHER PUBLICATIONS

Communication dated Mar. 19, 2024, issued by European Patent Office in European Patent Application No. 21898682.6.
(Continued)

*Primary Examiner* — Frantz B Jean
(74) *Attorney, Agent, or Firm* — Sughrue Mion, PLLC

(57) ABSTRACT

An electronic device in an example embodiment includes: a communication circuit configured to transmit and/or receive a signal; a memory configured to store instructions; and at least one processor operatively connected with the communication circuit and the memory. The at least one processor generates a public key regarding a user of the electronic device and a blockchain address; determines an external electronic device to share data; transmits, to the external electronic device through the communication circuit, an invitation message including information regarding the public key and the blockchain address; based on a response message, received from the external electronic device in response to the invitation message, generates a blockchain network including the external electronic device as a node; and stores information regarding the blockchain network in
(Continued)

an external server. Various other embodiments that can be understood through the specification are possible.

20 Claims, 21 Drawing Sheets

(51) Int. Cl.
  *H04L 9/30* (2006.01)
  *H04L 9/32* (2006.01)
(58) Field of Classification Search
  USPC .......................................................... 713/176
  See application file for complete search history.

(56) References Cited

U.S. PATENT DOCUMENTS

| | | | |
|---|---|---|---|
| 2018/0374173 | A1 | 12/2018 | Chen et al. |
| 2019/0068615 | A1* | 2/2019 | Pack .................. H04L 9/30 |
| 2019/0279206 | A1 | 9/2019 | Song et al. |
| 2019/0372756 | A1 | 12/2019 | Kim et al. |
| 2020/0159891 | A1 | 5/2020 | Patel et al. |

FOREIGN PATENT DOCUMENTS

| | | | |
|---|---|---|---|
| KR | 10-1948721 B1 | | 2/2019 |
| KR | 10-1986482 B1 | | 6/2019 |
| KR | 10-2019-0081299 A | | 7/2019 |
| KR | 1020190081299 | * | 7/2019 |
| KR | 10-2084674 B1 | | 3/2020 |
| KR | 10-2020-0074910 A | | 6/2020 |
| KR | 10-2020-0077681 A | | 7/2020 |
| KR | 10-2020-0094380 A | | 8/2020 |
| KR | 10-2162762 B1 | | 10/2020 |
| KR | 10-2207560 B1 | | 1/2021 |
| KR | 10-2268985 B1 | | 6/2021 |
| WO | 2019/072823 A1 | | 4/2019 |

OTHER PUBLICATIONS

International Search Report (PCT/ISA/210) issued Mar. 22, 2022 by the International Searching Authority in International Patent Application No. PCT/KR2021/017656.

Written Opinion (PCT/ISA/237) issued Mar. 22, 2022 by the International Searching Authority in International Patent Application No. PCT/KR2021/017656.

Communication issued Jan. 2, 2025 by the Korean Intellectual Property Office in Korean Patent Application No. 10-2020-0161727.

Communication dated Jun. 2, 2025, issued by the Korean Intellectual Property Office in Korean Application No. 10-2020-0161727.

* cited by examiner

ELECTRONIC DEVICE AND METHOD FOR SHARING DATA USING BLOCKCHAIN NETWORK

CROSS-REFERENCE TO RELATED APPLICATIONS

This application is a continuation application of International Application No. PCT/KR2021/017656, filed Nov. 26, 2021, which claims priorities from Korean Patent Application No. 10-2020-0161727, filed on Nov. 26, 2020, in the Korean Intellectual Property Office, the disclosures of which are herein incorporated by references in their entireties.

BACKGROUND

1. Field

The disclosure relates to an electronic device for sharing data based on blockchain technology, and an operating method of the electronic device.

2. Description of Related Art

A blockchain network is a network that is distinguished from a centralized network, in which a decision is made by a central server, and is expressed as a decentralized network. The blockchain network refers to a network in which a decision is made according to a consensus algorithm of nodes participating in the blockchain network.

A distributed ledger existing in the blockchain network may be stored in the respective nodes participating in the blockchain network. The distributed ledger existing in the blockchain network may be refined according to the consensus algorithm of the nodes participating in the blockchain network.

A blockchain refers to technology for maintaining security and integrity in a distributed network environment without a centralized server. As an example of a method for authenticating a user based on the blockchain, there is a method for issuing a key pair including a private key issued in a blockchain network and authenticating a user by using the key pair.

In the related art, an electronic device may share data through a normal messenger application to share data with an external electronic device, or may share data by backing up the data through a cloud.

When data is shared through a normal messenger application, a data sharer may not prevent the shared data from being re-shared with another user. That is, since a person owning shared data may not designate a data sharer, the data owner may lose ownership on a data file when sharing data. In addition, it may not be identified who shares the shared data. Accordingly, there is a problem that data can be shared beyond a data sharing range expected by a person sharing data.

In addition, when data is shared through a cloud, there is a problem that private data can be leaked due to a hacking accident, etc.

SUMMARY

According to an aspect of an example embodiment, provided is an electronic device including: a communication circuit configured to transmit and/or receive a signal; a memory configured to store instructions; and at least one processor operatively connected with the communication circuit and the memory, wherein the at least one processor is configured to execute the instructions and operate based on the instructions, the at least one processor being configured to: generate a public key regarding a first user of the electronic device and a blockchain address; determine an external electronic device to share data; transmit, to the external electronic device through the communication circuit, an invitation message including information regarding the public key and the blockchain address; based on a response message, received from the external electronic device in response to the invitation message, generate a blockchain network including the external electronic device as a node; and store information regarding the blockchain network in an external server.

According to an aspect of an example embodiment, provided is a method of operating an electronic device, the method including: generating a public key regarding a first user of the electronic device and a blockchain address; determining an external electronic device to share data; transmitting, to the external electronic device, an invitation message including information regarding the public key and the blockchain address; based on a response message, received from the external electronic device in response to the invitation message, generating a blockchain network including the external electronic device as a node; and storing information regarding the blockchain network in an external server.

According to aspects of the disclosure, an electronic device may generate a blockchain network with an external electronic device(s) to share data. In the process of generating the blockchain network, security in sharing data with the external electronic devices may be certified by using an attestation key.

According to aspects of the disclosure, data may be shared with an external electronic device(s) by using a blockchain network, so that a record related to data sharing, including a data sharing record and access authority, may be synchronized to a blockchain ledger in the form of a transaction and a block. Accordingly, data may be securely shared with the external elect device(s). For example, external electronic devices joining in the blockchain network may have the same data contents, and data shared based on blockchain technology may be prevented from being arbitrarily fabricated by a hacker.

In addition, an electronic device according to aspects of the disclosure may control authority to access shared data by sharing the data through a blockchain network. For example, a user of the electronic device according to aspects of the disclosure may prohibit shared data from being re-shared (or exported to an undesignated external device) by users of external electronic devices after the data is shared. In addition, the user of the electronic device may change (e.g., delete or withdraw) authority to access the shared data or set to allow users of external electronic devices to access data only for a desired period.

The effects achieved by the disclosure are not limited to those mentioned above, and other effects that are not mentioned above may be clearly understood to those skilled in the art based on the description provided above.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
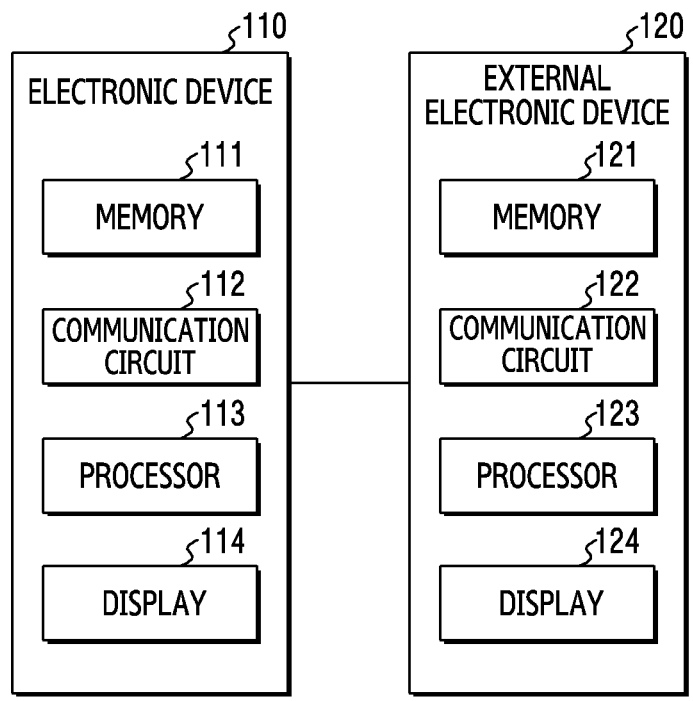
FIG. 1 is a block diagram of an electronic device according to an embodiment.

Embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

FIG. 1 is a block diagram of an electronic device according to an embodiment.

Referring to FIG. 1, the electronic device 110 may include a memory 111, a communication circuit 112, a processor 113, and a display 114, or any combination thereof. According to an embodiment, a memory 121, a communication circuit 122, a processor 123, and a display 124 of an external electronic device 120 may correspond to the memory 111, the communication circuit 112, the processor 113, and the display 114 of the electronic device 110, respectively, and may perform the same functions. In various embodiments, the electronic device 110 and the external electronic device 120 may include additional components in addition to the components illustrated in FIG. 1, or may omit at least one of the components illustrated in FIG. 1.

According to an embodiment, the memory 111 may store instructions that, when being executed, cause the processor 113 to process data to perform an operation of the electronic device 110 or to control the components of the electronic device 110. The memory 111 may include a security zone or a security memory zone (for example, a trust zone) that is accessible only through a separate security storage medium (for example, a security operating system (OS)).

According to an embodiment, the communication circuit 112 may be coupled with an external device, and may be configured to transmit and receive data. For example, the communication circuit 112 may transmit and receive data to and from the external electronic device 120. According to an embodiment, the communication circuit 112 may communicate with various external servers. For example, the electronic device 110 may transmit data to an external server by using the communication circuit 112, and may receive a response from the external server.

According to an embodiment, the processor 113 may be electrically and/or operatively coupled with the memory 111, the communication circuit 112, and the display 114. According to an embodiment, the processor 113 may execute computation or data processing related to control and/or communication of at least one other component of the electronic device 110 by using instructions stored in the memory 111. According to an embodiment, the processor 113 may include at least one of a central processing unit (CPU), a graphic processing unit (GPU), a micro controller unit (MCU), a sensor hub, a supplementary processor, a communication processor, an application processor, an application specific integrated circuit (ASIC), field programmable gate arrays (FPGAs), and the processor 113 may have a plurality of cores.

According to an embodiment, the display 114 may display various contents (for example, a text, an image, a video, an icon, and/or a symbol). According to an embodiment, the display 114 may include a liquid crystal display (LCD), a light emitting diode (LED) display, or an organic LED (OLED) display.

According to an embodiment, the processor 113 may generate a key pair in an asymmetric key encryption method (for example, public-key cryptography), by executing instructions included in the memory 111. In an embodiment, the memory 111 may store a generated private key. In an embodiment, the memory 111 in which the generated key pair is stored may refer to a security memory, which is a memory that provides a security environment.

According to an embodiment, the processor 113 may generate a blockchain address by using the private key. For example, the processor 113 may generate a public key by an elliptic curve algorithm by using the private key. In addition, the processor 113 may generate an address that is usable in a blockchain from the generated public key by using a hash function. According to an embodiment, the processor 113 may determine at least one external electronic device 120 to share data therewith. An operation of determining a user of the external electronic device 120 to share data with a user of the electronic device 101 will be described with reference to FIGS. 4 to 6.

According to an embodiment, the processor 113 may transmit data to the external electronic device 120 to share data with the external electronic device 120 by using the communication circuit 112. For example, a data sharing joining message may be transmitted to the external electronic device 120 to share data between the electronic device 110 and the external electronic device 120. In an embodiment, the data sharing joining message may include a uniform resource location (URL) including the public key and the blockchain address of the electronic device 110. Accordingly, the external electronic device 120 which intends to share data with the user of the electronic device 110 may access the URL and join in the blockchain network including the electronic device 110, thereby sharing data with the electronic device 110. According to various embodiments, the electronic device 110 may transmit the URL in other types of communication methods, in addition to the message type.

In an embodiment, the processor 113 may generate a blockchain network to share data with the external electronic device 120. For example, based on a response message of the external electronic device 120 which receives an invitation message from the user of the electronic device 110 and accesses the URL in response to the invitation message, the processor 113 may generate the blockchain network including the external electronic device 120 as a node. In an embodiment, the processor 113 may store information on the generated blockchain network in an external server by using the communication circuit 112. In an embodiment, the external server may be a server that is accessed by a plurality of electronic devices and shares data. According to an embodiment, an operation of the electronic device 110 generating the blockchain network will be described in detail with reference to FIG. 3.

According to various embodiments, the electronic device 110 and/or the external electronic device 120 may include a portable electronic device. For example, the electronic device 110 and/or the external electronic device 120 may include a mobile device, a tablet personal computer (PC), and/or a notebook computer.

Figure 2:
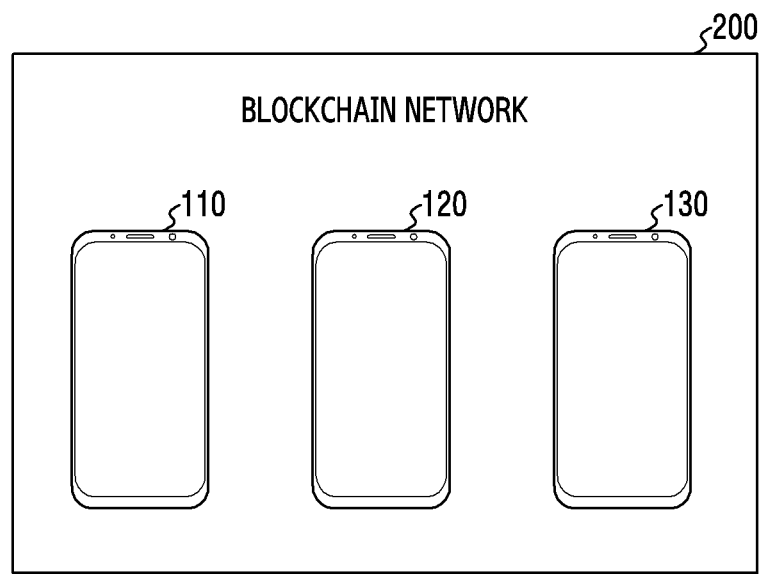
FIG. 2 is a view to explain a blockchain network according to an embodiment.

FIG. 2 is a view to explain a blockchain network according to an embodiment.

Referring to FIG. 2, a plurality of electronic devices 110, 120, 130 may constitute a blockchain network 200. As described above with reference to FIG. 1, each of the plurality of electronic devices 110, 120, 130 constituting the blockchain network may include a portable electronic device. For example, the plurality of electronic devices 110, 120, 130 may be a mobile device, a tablet PC and/or a notebook computer.

According to the disclosure, it is illustrated that three electronic devices 110-130 constitute the blockchain network for convenience of explanation, but this should not be considered as limiting. According to an embodiment, the electronic device 110 may form a blockchain network with external electronic devices to share data therewith. For example, the electronic device 110 may constitute a blockchain network with the external electronic devices 120, 130 as nodes. According to an embodiment, the electronic device 110 may generate a plurality of blockchain networks to share data. For example, a first blockchain network including the electronic device 110 and other external electronic devices (not shown), and a second blockchain network including the electronic device 110, and the external electronic devices 120, 130 may be generated.

According to an embodiment, the processor 113 may generate a plurality of public keys and private keys corresponding to the public keys, based on a root seed. According to an embodiment, the electronic device 110 may generate a plurality of public keys and private keys corresponding to each of the plurality of blockchain networks including the electronic device 110 as a node. Accordingly, blockchain networks corresponding to the plurality of public keys, respectively, may be constituted based on the plurality of public keys. In the disclosure, the blockchain network generated to share data may be expressed as a data sharing channel. The respective data sharing channels may be classified by users included in corresponding data sharing channels. For example, when electronic devices constituting the blockchain networks are different, the electronic devices may be classified to different data sharing channels.

According to an embodiment, the blockchain network 200 may include a blockchain ledger which is based on the corresponding blockchain network. That is, there may be blockchain ledgers corresponding to the blockchain networks, respectively. In an embodiment, the blockchain ledger may include a block ledger in which transaction data is stored, and world state data in which values changed by executing a transaction are stored in the form of a key-value. The world state data may refer to data stored in a world state which is a database used in a hyper ledger fabric. However, this should not be considered as limiting.

The world state may be a kind of database used in the hyper ledger fabric, and may store final values changed by executing a transaction in the form of a key value. Accordingly, in order to identify final values by execution of a transaction within the blockchain network 200, world state data has only to be identified. The world state data stored in the world state may indicate the same value in all of the electronic devices constituting the blockchain network. That is, the world state data may have the same characteristics as global variables within the blockchain network.

In an embodiment, the block may include transaction data containing information for performing a smart contract. According to an embodiment, blocks of the blockchain ledger may form a chain form and may store block data in the block ledger. According to an embodiment, all blockchain nodes included in the blockchain network 200 may own the same blockchain ledger. Accordingly, when different blockchain ledgers are found, the blockchain nodes may doubt reliability and/or validity on a corresponding block.

The block ledger may include a block header and transaction data. According to an embodiment, the block header may include at least one of a hash value of a header and a data area, a hash value of a previous block, a height value of a block, a hash value of world state data after a transaction is performed, which is included in the block, a public key of a block generator, a value of signing a hash with a private key of the block generator, and a value of signing a hash value with an attestation key certification chain or an attestation key.

The block data in the block ledger may include at least one of a hash value of at least part of the transaction data, version information of the smart contract, a smart contract ID, a smart contract function ID, smart contract data which is a factor value necessary for the smart contract function, a nonce value which is a transaction generation number of a transaction generator, a public key of the transaction generator, a value of singing a hash value with a private key of the transaction generator, and a value of signing an attestation key certification chain or a hash value with an attestation key.

Figure 3:
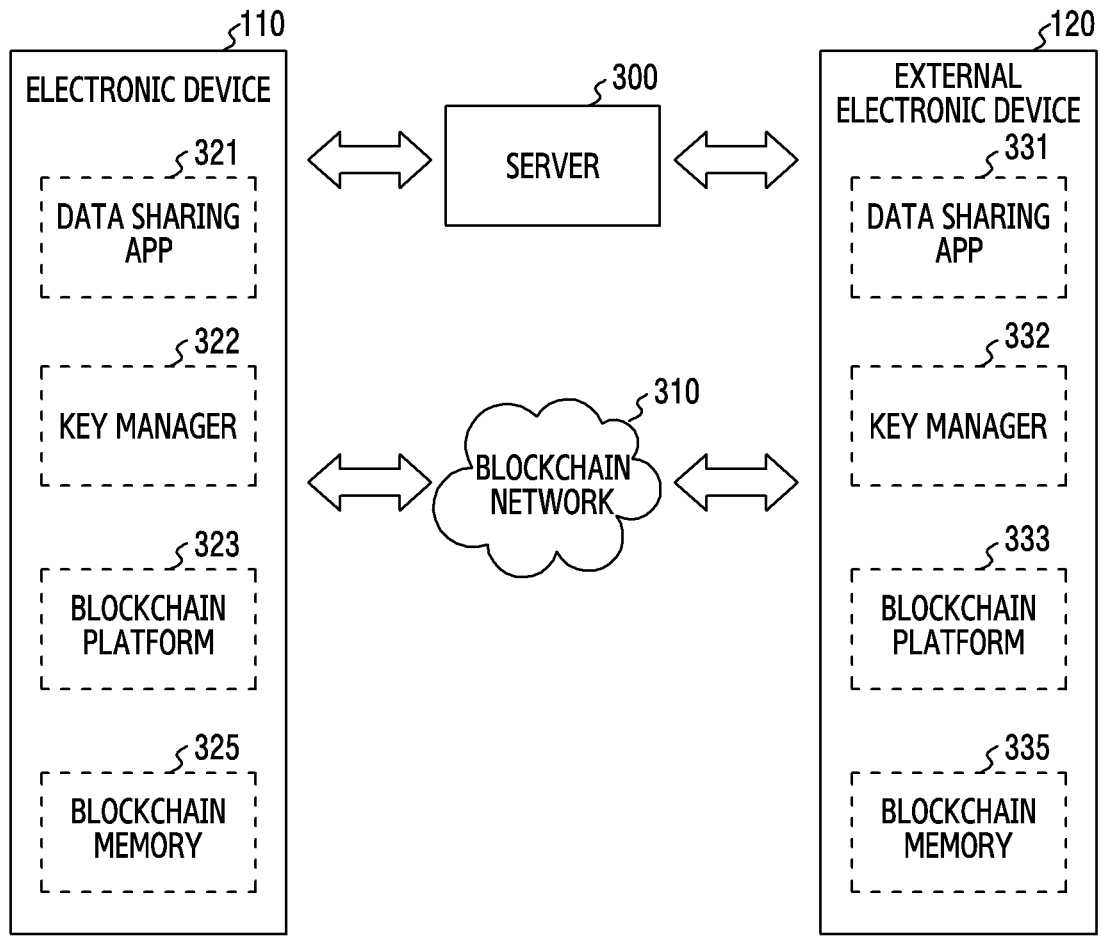
FIG. 3 is a view to explain a configuration of a system for sharing data by using a blockchain network according to an embodiment.

FIG. 3 is a view to explain a configuration of a system for sharing data by using a blockchain network according to an embodiment.

Referring to FIG. 3, an electronic device 110 may include a data sharing application (APP) 321, a key manager 322, a blockchain platform 323, and/or a blockchain memory 325. According to an embodiment, the blockchain platform 323 may correspond to a blockchain application which is stored in the memory 111 and performs an operation related to a blockchain, or a blockchain module which is included in the processor 113 and performs an operation related to the blockchain. In an embodiment, the electronic device 110 may perform the operation related to the blockchain, based on a blockchain network 310, through the blockchain platform 323. For example, the electronic device 110 may perform ledger synchronization, transaction signature and/or transaction recording on the blockchain network 310 through the blockchain platform 323. According to an embodiment, the processor 113 may execute the data sharing APP 321 stored in the memory 111, based on a user input of the electronic device 110. The user of the electronic device 110 may execute the data sharing APP 321 to invite a user of an external electronic device 120 to share data therewith.

According to an embodiment, when the user of the electronic device 110 executes the data sharing APP 321, the processor 113 may generate a root seed through the key manager 322. The root seed refers to a base value for generating a plurality of keys and a blockchain address from one root seed. The root seed may refer to a value that is arbitrarily generated under a condition of a usable range in the blockchain network. According to an embodiment, the root seed may be generated based on various dynamic characteristics occurred during an operation of the electronic device 110. For example, the electronic device 110 may generate the root seed from a value outputted from a temperature sensor of the electronic device 110 or a current value at a specific position. In another example, the electronic device 110 may generate the root seed by using a unique value of a hardware chip included in the electronic device 110. The electronic device 110 may restore key values generated through the root seed. The processor 113 may acquire a mnemonic hash-based root seed from the key manager 322. The mnemonic hash-based root seed may use a mnemonic word. The mnemonic word may include words that a person can recognize. According to various embodiments, the root seed may use various types of seeds. For example, the root seed may use a seed that is formed of hexadecimal numbers or may use a seed that is formed of a mnemonic formed of 12 words. In this case, the mnemonic may include a word form that a user can recognize. For example, the root seed may use a mnemonic based on BIP-39 standards. A mnemonic code and a seed may be generated based on BIP-39 standards. A seed of 512 bits may be generated by using words included in the mnemonic and a salt value (for example, a password inputted by a user) as factors, by using a key stretching function. The key stretching function (for example, PBKDF2) may output a predetermined (512 bits) value by using two factor values. For example, the key stretching function may iteratively perform hashing by using two factor values by a hash algorithm (for example, HMAC-SHA512), and may generate a final output value as a root seed.

According to an embodiment, the electronic device 110 may select the external electronic device 120 to share data therewith, based on the data sharing APP 321. According to various embodiments, the electronic device 110 may select the external electronic device 120, based on various identifiers. For example, the electronic device 110 may receive a user input of selecting a target, to which an invitation message is to be transmitted, from a user list that displays at least one of a phone number or a nickname of the user of the external electronic device 120. According to another embodiment, the electronic device 110 may select a plurality of external electronic devices to share data. According to an embodiment, the electronic device 110 may form one group with the selected external electronic devices, and may generate a data sharing channel to share data within the group.

According to an embodiment, the processor 113 may generate a public key through the key manager 322, based on the generated root seed. According to an embodiment, the key manager 322 may generate a hierarchical deterministic path (HDpath)-based public key by using the root seed. According to an embodiment, the processor 113 may generate a master private key and a master chain code from a hash value generated through the HMAC-SHAR 512 algorithm function, based on the root seed. The processor 113 may use 256 bits on the left of the hashed value of 512 bits as a private key, and may use 256 bits on the right of the hashed value of 512 bits as a chain code. The public key may be acquired by using the private key and an elliptic curve function.

According to an embodiment, the processor 113 may generate a blockchain address through the key manager 322, based on the public key. The blockchain network may be indicated by using the blockchain address. According to an embodiment, when the electronic device 110 generates a plurality of blockchain networks, public keys corresponding to the plurality of blockchain networks, respectively, may be generated. Accordingly, blockchain addresses corresponding to the plurality of blockchain networks, respectively, may be generated based on the public keys.

According to an embodiment, the processor 113 may generate an invitation message to be transmitted to the external electronic device 120 to share data. The invitation message may include a URL. According to an embodiment, the external electronic device 120 may access a server 300 by using the URL included in the invitation message. According to an embodiment, the external electronic device 120 may access the server 300 by using the URL, and the URL may include a link address of the data sharing APP 321.

According to an embodiment, the processor 113 may perform an electronic signature with a private key of the user of the electronic device 110 through the key manager 322 in order to attest validity of the invitation URL. According to an embodiment, the electronic device 110 may perform an electronic signature on a base URL with the private key of the user of the electronic device 110, and may acquire signature data as a result of the electronic signature. For example, the electronic device 110 may generate a hash value from data including the invitation URL by using a hash function. For example, the electronic device 110 may acquire a hash value from the invitation URL by using a hash function such as SHA256. The electronic device 110 may perform an electronic signature based on the acquired hash value and the private key. The signature data acquired by completing the electronic signature may include encryption data in which the hash value is encrypted by using the private key. According to an embodiment, the electronic device 110 may add the signature data which is generated based on the private key of the user of the electronic device 10 to the base URL.

According to an embodiment, the processor 113 may perform an electronic signature with an attestation key of the user of the electronic device 110 through the key manager 322, in order to attest reliability of the invitation URL. According to an embodiment, the attestation key may indicate an attestation key stored in a key repository of the electronic device 110. According to an embodiment, the electronic device 110 and the external electronic device 120 may identify that the electronic devices and the data sharing APP 321 are not modulated, through the electronic signature based on the attestation key. According to an embodiment, the electronic device 110 may perform an electronic signature on the base URL with the attestation key of the electronic device 110, and may generate signature data. For example, the signature data obtained by completing the electronic signature may include encryption data in which a hash value is encrypted by using the attestation key. According to an embodiment, the electronic device 110 may add the signature data generated based on the attestation key of the user of the electronic device 110 to the base URL.

According to an embodiment, the invitation URL may include at least one of an address of a host based on the user of the electronic device 110 who invites, the public key of the user of the electronic device 110, data which is signed with the private key of the user of the electronic device 110, or data which is signed with the attestation key of the user of the electronic device 110. For example, the invitation URL may have a form of https://www.privacy.com/invitation? invitationId=1&address=aaa&publicKey= pKey& public KeySignature=s1&sakSignature=s2. According to an embodiment, the invitation URL may be configured by various data. For example, the invitation URL may include a domain address (for example, https://www.privacy.com/ invitation), an invitation ID (for example, invitationId=1) and/or an address of a host (for example, address=aaa). In addition, the invitation URL may include a public key (for example, publicKey=pKey) of the user (host) of the electronic device 110, signature data (for example, public KeySignature=s1) on which the invitation URL is signed with the public key of the user (host) of the electronic device 110, and/or data (for example, sakSignature=s2) which is signed with an attestation key of the user of the electronic device 110.

According to an embodiment, the blockchain memory 325 may store a variety of information related to the blockchain. For example, the electronic device 110 may store world state data and/or at least one contract (for example, smart contract) information. In an embodiment, the blockchain platform 323 may perform an operation by using information related to the blockchain that is stored in the blockchain memory 325. In addition, information stored in the blockchain platform 323 may also be stored in the blockchain memory 325.

According to an embodiment, the electronic device 110 may transmit an invitation message including an invitation URL to the external electronic device 120 through the server 300. The external electronic device 120 which receives the invitation URL may execute a data sharing APP 331 through the invitation URL included in the invitation message. In another embodiment, when the data sharing APP 331 is not stored in the memory 121 of the external electronic device 120, the external electronic device 120 may download the data sharing APP 331 through an external server, and may execute the same.

According to an embodiment, the external electronic device 120 may identify an attestation key value which is electronically signed on the invitation URL through a key manager 332 in order to identify reliability of the invitation URL included in the invitation message. According to an embodiment, the external electronic device 120 may identify a public key for the user of the electronic device 110 that is signed on the invitation URL through the key manager 332 in order to identify validity of the invitation URL.

According to an embodiment, when the user of the external electronic device 120 wants to share data with the user of the electronic device 110, that is, wants to share data with the electronic device 110 by using the data sharing APP 331, the external electronic device may generate acceptance data to accept the invitation. According to various embodiments, the acceptance data for accepting the invitation may be configured in various forms, and for example, may be configured by a response message to the invitation.

According to an embodiment, the processor 123 of the external electronic device 120 may encrypt the acceptance data with the public key for the user of the electronic device 110 for the sake of security of the acceptance data. In an embodiment, the processor 123 may transmit the encrypted acceptance data to the electronic device 110 via the communication circuit 122.

According to an embodiment, the processor 123 may electronically sign acceptance data with the private key of the user of the external electronic device 120 through the key manager 332 in order to attest validity of the acceptance data. According to an embodiment, the external electronic device 120 may perform an electronic signature of the acceptance data with the private key of the user of the external electronic device 120, and may generate signature data. The signature data obtained by completing the electronic signature may include encryption data. The encryption data may include data in which a hash value is encrypted by using the private key. According to an embodiment, the external electronic device 120 may perform an electronic signature on the acceptance data by using the private key of the user of the external electronic device 120, and may add the signature data generated through the electronic signature to the acceptance data.

According to an embodiment, the processor 123 may perform an electronic signature with the attestation key of the user of the external electronic device 120 through the key manager 332 in order to attest reliability of the acceptance data. According to an embodiment, the attestation key may indicate an attestation key that is stored in the key repository of the external electronic device 120. According to an embodiment, the external electronic device 120 may certify that the external electronic device 120 and the data sharing APP 331 are not modulated, through signature data based on an attestation key of the external electronic device 120. According to an embodiment, the external electronic device 120 may perform an electronic signature of the acceptance data with the attestation key of the external electronic device 120, and may generate signature data. The signature data generated by completing the electronic signature may include encryption data in which a hash value is encrypted through the attestation key. According to an embodiment, the external electronic device 120 may add the signature data generated based on the attestation of the user of the external electronic device 120 to the acceptance data.

According to an embodiment, the external electronic device 120 may transmit the acceptance data to the electronic device 110 through the server 300. Accordingly, the user of the electronic device 110 may receive the acceptance data transmitted by the user of the external electronic device 120. In an embodiment, the electronic device 110 may receive the acceptance data. In addition, the electronic device 110 may receive a notification indicating that the user of the external electronic device 120 wants to share data with the user of the electronic device 110 through the data sharing APP 321. According to an embodiment, the notification may be generated through the data sharing APP 321.

According to an embodiment, the electronic device 110 may identify an attestation key value which is signed on the acceptance data and is based on the external electronic device 120, in order to identify reliability of the acceptance data. For example, the electronic device 110 may identify the attestation key value, which is signed on the acceptance data and is based on the external electronic device 120, through the key manager 322 in order to identify reliability of the acceptance data received from the external electronic device 120. According to an embodiment, the electronic device 110 may identify a public key value of the user of the external electronic device 120 that is signed on the acceptance data through the key manager 322 in order to identify validity of the acceptance data received from the external electronic device 120. According to an embodiment, the electronic device 110 may decrypt the encrypted acceptance data with the private key of the user of the electronic device 110 through the key manager 322.

According to an embodiment, when reliability and validity of the acceptance data are identified, the electronic device 110 may generate a blockchain network including the external electronic device 120 and the electronic device 110 as blockchain nodes. According to an embodiment, the electronic device 110 may generate the blockchain network 310 through the blockchain platform 323. In an embodiment, the electronic device 110 may perform an operation related to the blockchain with respect to the blockchain network 310 through the blockchain platform 323. For example, the blockchain platform 323 may manage generation of a transaction and a block record in the blockchain network 310.

According to an embodiment, the electronic device 110 may request a first transaction from the blockchain network 310 through the blockchain platform 323 so as to include the external electronic device 120, with which the user of the electronic device 110 will share data, as blockchain nodes of the blockchain network 310.

According to an embodiment, the first transaction may generate a first contract (for example, a first smart contract) to generate the blockchain network 310 and to add a user who will share data in the blockchain network 310. According to an embodiment, the first contract may include various data. For example, the first contract may include an invitation ID, an identifier of an invitation acceptance user, an address of the invitation acceptance user, a public key of the invitation acceptance user, signature data signed with the public key of the invitation acceptance user, and signature data signed with an attestation key of the invitation acceptance user. According to an embodiment, the processor 113 may execute the data sharing APP 321 to register information of the generated blockchain network 310 at the server 300.

According to an embodiment, the processor 113 may execute the data sharing APP 321 to generate a proposal block based on the first transaction and the first contract, through the blockchain platform 323, and to examine validity of the proposal block. The blockchain platform 323 may synchronize the proposal block, and a block receiver receiving the proposal block may examine whether the proposal block is valid through a blockchain platform 333. This will be described below with reference to FIG. 13.

According to an embodiment, the external electronic device 120 may transmit and receive data to and from the blockchain network 310, and may include the blockchain platform 333 including instructions to manage generation of a transaction and block recording. According to an embodiment, the processor 123 may perform the first contract through the blockchain platform 333. When the first contract is performed, the blockchain platform 333 may record world state data regarding the first contract on a world state of a ledger of the blockchain network 310. According to an embodiment, the external electronic device 120 may register information on the blockchain network 310 of the user of the external electronic device 120 at the server 300.

Figure 4:
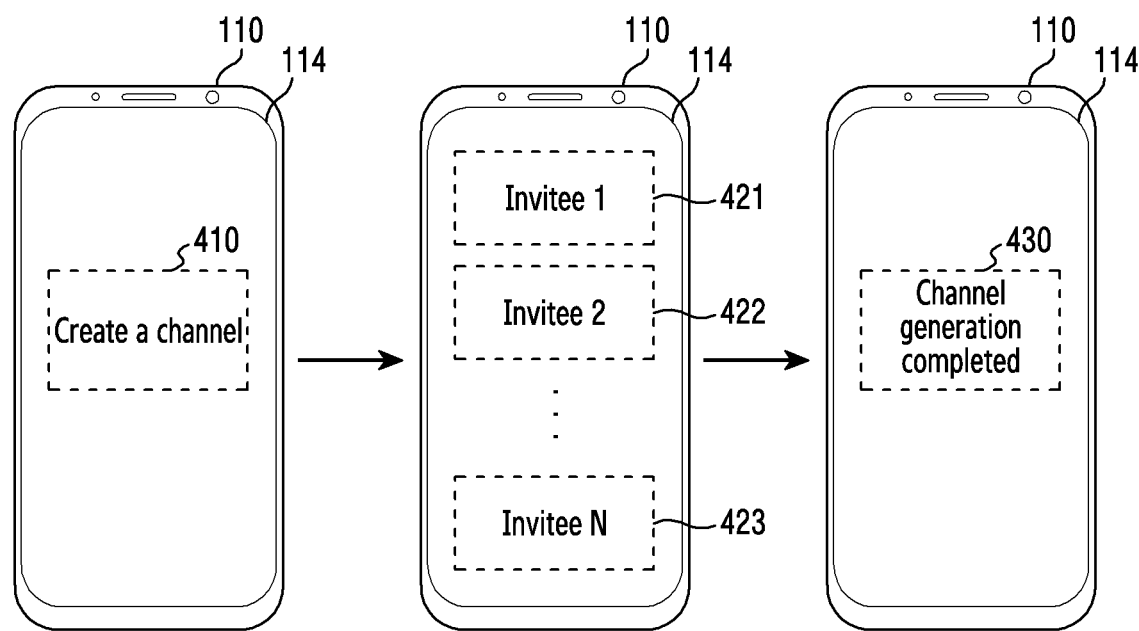
FIG. 4 is a view illustrating an example of a user interface which generates a channel for sharing data through a data sharing application according to an embodiment.

FIG. 4 is a view illustrating an example of a user interface for generating a channel for sharing data through a data sharing application according to an embodiment.

Referring to FIG. 4, the electronic device 110 according to an embodiment may generate the blockchain network 310 for sharing data by executing the data sharing APP 321. According to an embodiment, the blockchain network 310 may be expressed by a data sharing channel. According to an embodiment, the processor 113 may select external electronic devices to share data. In an embodiment, when the user of the electronic device 110 executes the data sharing APP 321 to generate a channel, the processor 113 may output a channel generation 410 through the display 114. According to an embodiment, when the user of the electronic device 110 selects the channel generation 410, the processor 113 may output users 421-423 of external electronic devices as candidates with whom to share data. In an embodiment, the user of the electronic device 110 may select a user(s) to share data from the users 421-423 of the external electronic devices as an invitee(s).

In an embodiment, when the electronic device 110 receives acceptance data for accepting sharing of data from the invitees, the blockchain network 310 may be generated. For example, the electronic device 110 and the invited external electronic devices may perform an operation of generating the blockchain network 310. Accordingly, the processor 113 may output a channel generation completion notification 430 through the display 114.

According to an embodiment, the invitees may transmit acceptance data at different times, that is, may join in the blockchain network 310 as nodes at different times. This will be described below with reference to FIG. 8.

Figure 5:
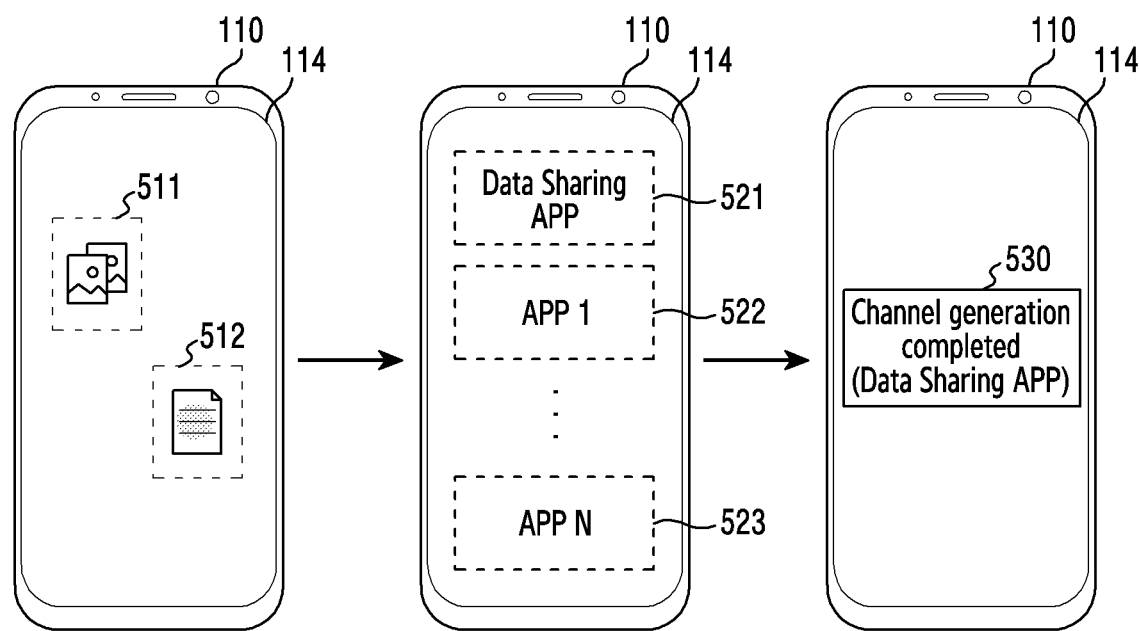
FIG. 5 is a view illustrating an example of a user interface which is displayed in a process of sharing data by using a list for selecting a method of sharing a content according to an embodiment.

FIG. 5 is a view illustrating an example of a user interface which is displayed in a process of sharing data by using a list for selecting a content sharing method according to an embodiment.

Referring to FIG. 5, the electronic device 110 according to an embodiment may generate the blockchain network 310 for sharing data in the middle of executing an application providing a content. For example, the electronic device may execute a gallery content 511 or a document content 512, and may share the same with respective users of the external electronic devices through the data sharing APP 321. According to an embodiment, the processor 113 may output, via the display 114, the gallery content 511 or the document content 512 as candidate data to share. In an embodiment, the user of the electronic device 110 may select the document content 512 as a file to share.

According to an embodiment, when the user selects the document content 512 to share, the user may select an application for sharing the document content 512. The processor 113 may output, via the display 114, a list of various applications 521 to 523 for sharing the document content 512. In an embodiment, the electronic device 110 may receive a user input of selecting the data sharing APP 521 as an application for sharing the document content 512. According to an embodiment, when the blockchain network 310 for sharing the document content 512 is not generated, the electronic device 110 may perform the operation of generating the blockchain network 310 as described with reference to FIGS. 3 and 4, in response to the user input of selecting the data sharing APP 521. The electronic device 110 may generate the blockchain network 310 for sharing the document content 512 with external electronic devices. The processor 113 may output a notification indicating that the blockchain network 310 is generated, that is, a channel generation completion notification 530, through the display 114. In an embodiment, the channel generation completion notification 530 may further include a notification indicating that the blockchain network is generated through the data sharing APP.

Figure 6:
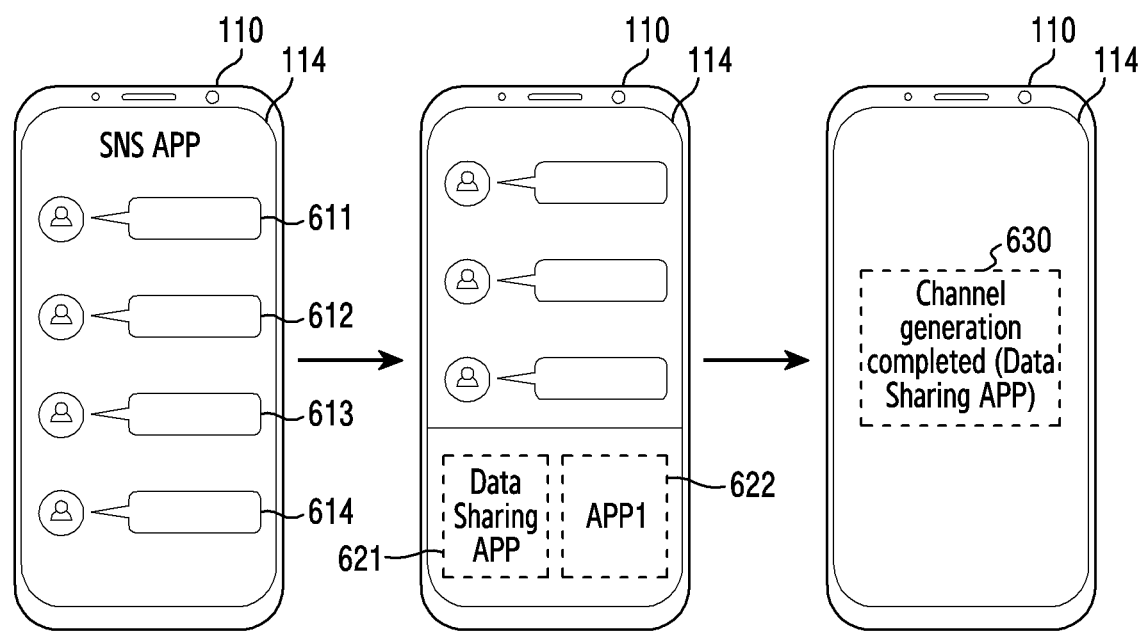
FIG. 6 is a view illustrating an example of a user interface which is displayed in a process of sharing data in the middle of executing a social network service (SNS) application according to an embodiment.

FIG. 6 is a view illustrating an example of a user interface which is displayed in a process of sharing data in the middle of executing a social network service (SNS) application according to an embodiment.

Referring to FIG. 6, the electronic device 110 according to an embodiment may execute an SNS APP, and may generate the blockchain network 310 for sharing data. For example, the processor 113 may execute the SNS application and may output items 611-614 indicating users of external electronic devices through the display 114. According to an embodiment, the user of the electronic device 110 may select at least one user to share data from users 611-614 of external electronic devices. According to an embodiment, the processor 113 may generate the blockchain network 310 to include external electronic devices of users who will share data selected by the user of the electronic device 110, as blockchain nodes.

According to an embodiment, when the user of the electronic device 110 selects users to share data, the processor 113 may provide guidance on a method of sharing data through the display 114. For example, the processor 113 may output a data sharing APP 621 and/or another APP1 622 to select one therefrom through the display 114. When the electronic device 110 receives a user input of selecting the data sharing APP 621, the electronic device 110 and the external electronic devices selected to share data may perform the operation of generating the blockchain network 310. According to an embodiment, when the blockchain network 310 is generated, the processor 113 may output a channel generation completion notification 630 through the display 114.

According to various embodiments, the electronic device 110 may generate the blockchain network 310 through various methods, without being limited to descriptions in the disclosure, in order to share data with the external electronic devices based on blockchain technology.

Figure 7:
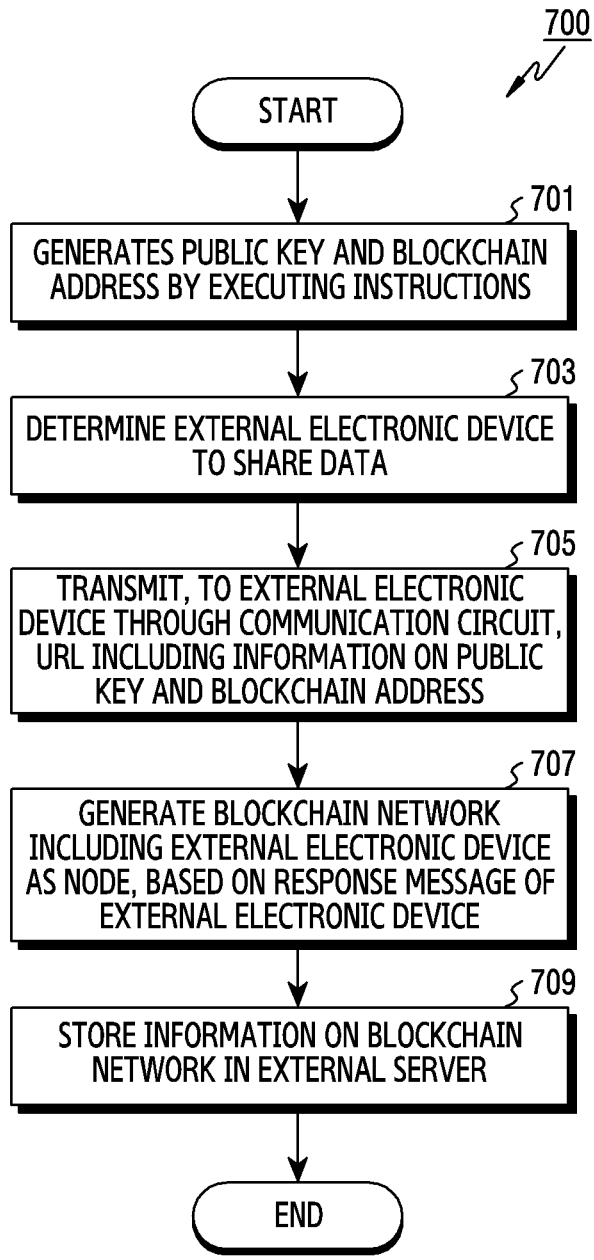
FIG. 7 is a flowchart illustrating an operation of generating a blockchain network in an electronic device according to an embodiment.

FIG. 7 is a flowchart 700 illustrating an operation of generating a blockchain network of an electronic device according to an embodiment.

In operation 701, the processor 113 according to an embodiment may generate a public key of the user of the electronic device 110 and a blockchain address by executing instructions stored in the memory 111. For example, the processor 113 may generate a root seed through the key manager 322, and may generate the public key based on the root seed. In addition, the processor 113 may generate the blockchain address based on the public key through the key manager 322. In an embodiment, a blockchain network may be indicated by the blockchain address.

According to an embodiment, in operation 703, the processor 113 may select at least one external electronic device to share data. The at least one external electronic device selected by the processor 113 may form one group. According to an embodiment, the group may be included as blockchain node(s) included in the blockchain network.

According to an embodiment, in operation 705, the processor 113 may transmit an invitation URL including information regarding the public key and the blockchain address to the at least one external electronic device selected in operation 703 through the communication circuit 112. According to an embodiment, the invitation URL may indicate an invitation URL regarding an application for sharing data. The selected external electronic devices may receive an application link through the invitation URL, and may download the application for sharing data through the application link. According to an embodiment, the processor 113 may transmit the invitation URL including signature data which is signed with the public key to the at least one selected external electronic device in order to attest validity of the invitation URL.

According to an embodiment, in operation 707, the electronic device 110 may generate a blockchain network 310 including at least one external electronic device as a blockchain node through the blockchain platform 323, based on a response message of the at least one selected external electronic device. For example, the processor 113 may receive a response message to the invitation URL from the at least one selected external electronic device, through the communication circuit 112. The blockchain platform 323 may generate the blockchain network 310 including the at least one selected external electronic device and the electronic device 110, based on the response message for accepting sharing of data. According to an embodiment, the electronic device 110 and the at least one selected external electronic device may share data in the blockchain network 310 based on the blockchain technology. According to an embodiment, the electronic device 110 may generate a plurality of blockchain networks corresponding to types of at least one selected external electronic device, respectively.

According to an embodiment, in operation 709, the processor 113 may store information regarding the blockchain network in an external server. For example, the processor 113 may store, in the external server through the communication circuit 112, blockchain network generation information, and information regarding the electronic device and the at least one external electronic device included in the generated blockchain network 310. According to an embodiment, the information regarding the electronic device and the at least one external electronic device included in the generated blockchain network 310 may include respective account information, phone numbers and/or device IDs of the electronic devices.

Figure 8:
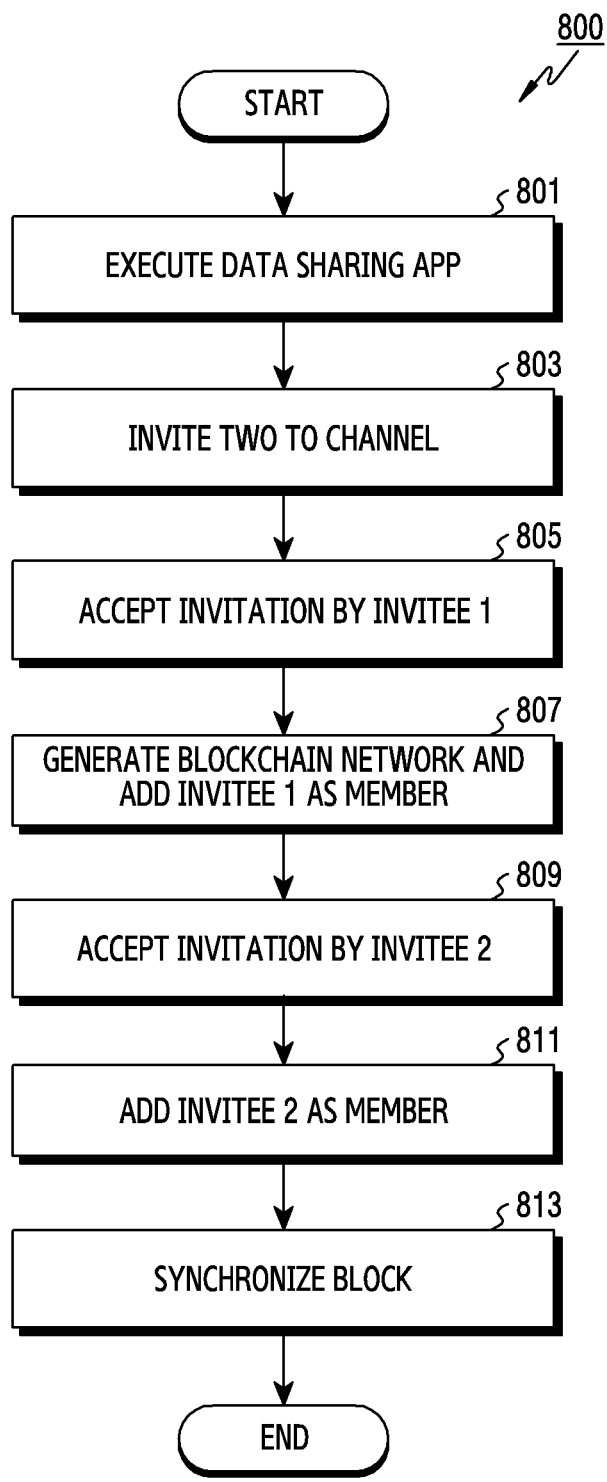
FIG. 8 is a flowchart illustrating an operation of generating a blockchain network with a plurality of external electronic devices.

FIG. 8 is a flowchart 800 illustrating an operation of generating a blockchain network with a plurality of external electronic devices.

Referring to FIG. 8, in operation 801, the processor 113 may execute the data sharing APP 321 for sharing data by executing instructions stored in the memory 111. For example, the processor 113 may execute the data sharing APP 321 based on blockchain technology. According to an embodiment, the user of the electronic device 110 may select a user of at least one external electronic device to share data. For example, in operation 803, the user of the electronic device 110 may invite two users of external electronic devices to share data. The users may be invited to a blockchain network including external electronic devices to share data and the electronic device 110. For example, the user of the electronic device 110 may invite the two users of the external electronic devices by transmitting an invitation URL regarding the data sharing APP 321 through the processor 113.

According to an embodiment, when respective users of the plurality of external electronic devices are invited, the respective users may accept the invitation at different times. For example, the time to transmit acceptance data to an invitation URL may vary according to external electronic devices. According to an embodiment, in operation 805, invitee 1 out of the two invitees may accept the invitation. That is, the processor 113 may receive acceptance data from the invitee 1. According to an embodiment, the invitation acceptance of the invitee 1 may include signature data that is signed with a private key of the invitee 1 to attest validity of the invitation acceptance. In addition, an attestation key value of the invitee 1 may be included as signature data to attest reliability of the invitation acceptance.

According to an embodiment, in operation 807, the blockchain platform 323 may generate a blockchain network and may add the invitee 1 as a member, based on the invitee 1 transmitting acceptance data first. That is, the external electronic device of the invitee 1 may be added as a blockchain node included in the blockchain network.

According to an embodiment, the operations of generating the blockchain network and adding the invitee 1 as a member may include an operation of requesting generation of a first invitation transaction to generate the blockchain network through the blockchain platform 323 and to include the invitee 1 as a blockchain node of the blockchain network 310. In addition, the first invitation transaction may include an operation of generating a first invitation smart contract to generate the blockchain network and to add the invitee 1 to the blockchain network 310. According to an embodiment, the blockchain platform 323 may execute the first invitation smart contract, and may record data based on the first invitation smart contract on a world state.

According to an embodiment, in operation 809, the invitee 2_may accept the invitation similarly to the invitee 1 accepting the invitation. That is, the electronic device 110 may receive acceptance data from the invitee 2. Likewise, the acceptance data of the invitee 2 may include signature data which is signed with a private key of the invitee 2 and signature data which is signed with an attestation key to attest validity and reliability.

According to an embodiment, in operation 811, the blockchain platform 323 may add the invitee 2 as a blockchain node included in the generated blockchain network. According to an embodiment, the operation of adding the invitee 2 as a member may include an operation of requesting generation of a second invitation transaction to include the invitee 2 as a blockchain node of the blockchain network 310 through the blockchain platform 323. In addition, the second invitation transaction may include an operation of generating a second invitation smart contract to add the invitee 2. According to an embodiment, the blockchain platform 323 may execute the second invitation smart contract, and may record data based on the second invitation smart contract on the world state.

In an embodiment, based on the operation of adding the invitee 2 as a member, the external electronic device of the invitee 2 may be added to the blockchain network which is formed of the external electronic device of the invitee 1 and the user of the electronic device 110. Accordingly, the user of the electronic device 110 may share data with the invitee 1 and the invitee 2.

According to an embodiment, in operation 813, the electronic device 110 may generate a transaction regarding the generated blockchain network and the nodes included in the blockchain network (for example, the electronic device, the external electronic device of the invitee 1, the external electronic device of the invitee 2), through the blockchain platform 323, and may generate a synchronized block and may record the transaction. Block synchronization will be described below with reference to FIG. 13.

Figure 9:
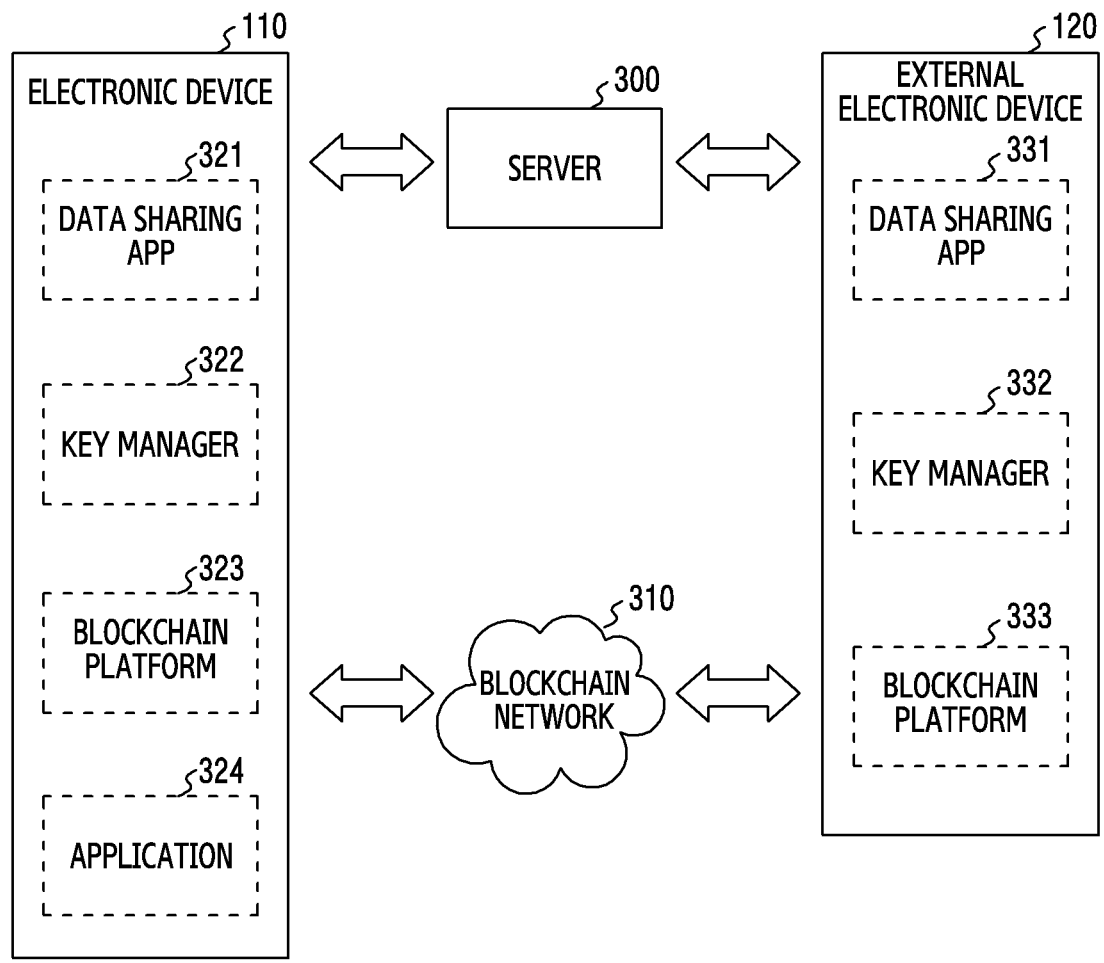
FIG. 9 is a view to explain a configuration of a system for sharing data in an electronic device according to an embodiment.

FIG. 9 is a view illustrating a configuration of a system for an electronic device to share data according to an embodiment.

Referring to FIG. 9, the electronic device 110 may include a data sharing APP 321, a key manager 322, a blockchain platform 323, and an application 324 related to data to share. According to an embodiment, based on an input of a user of the electronic device 110, the processor 113 may execute the application 324 stored in the memory 111. The application 324 may provide data to share. For example, the application 324 may provide a photo, a video, and/or document data. According to an embodiment, the user of the electronic device 110 may select data to share with an external electronic device 120 through the application 324.

According to an embodiment, the user of the electronic device 110 may select a blockchain network 310 to share the selected data. According to an embodiment, the processor 113 may execute the data sharing APP 321, and may control to cause the user of the electronic device 110 to select the blockchain network 310. According to an embodiment, the user of the electronic device 110 may select at least one blockchain network among a plurality of blockchain networks in order to share data. According to an embodiment, the blockchain network 310 may be generated by performing the operations described with reference to FIGS. 3 to 6.

According to an embodiment, the processor 113 may encrypt data to share with the external electronic device 120 with a symmetric key which is known to all of the electronic device 110 and the external electronic device 120. For example, the electronic device 110 and the external electronic device 120 may know each other's public keys. Accordingly, the processor 113 may encrypt data to share with a private key of the electronic device 110. According to an embodiment, the processor 113 may copy the encrypted sharing data into an internal repository of the data sharing APP 321 that is accessible through the data sharing APP 321. In an embodiment, the internal repository of the data sharing APP 321 may be included in the memory 111.

According to an embodiment, the processor 113 may upload the encrypted sharing data on a server 300 through the communication circuit 112. Accordingly, a user of the external electronic device 120, which is selected by the user of the electronic device 110 and is included in the blockchain network 310, may access the encrypted sharing data through the server 300.

According to an embodiment, the electronic device 110 may generate a second transaction containing detailed information regarding data to share in the blockchain network 310 through the blockchain platform 323. According to an embodiment, the user of the electronic device 110 may generate the second transaction to control authority to access the data to share, through the blockchain platform 323. For example, the electronic device 110 may generate the second transaction to control data reading, deletion, an access expiration date, and/or modification through the blockchain platform 323. According to an embodiment, the second transaction may generate a second contract (for example, a second smart contract) containing detailed information regarding data sharing. According to an embodiment, the second contract may include various data. For example, the second contract may include at least one of a unique ID of data sharing, a data sharing blockchain network ID, a symmetric key used for encryption of data, an address of a person sending data (second transaction generator), an address of a person receiving data, data in which a data download address is encrypted with a symmetric key, a data name, data authority, a data sharing time, a data access expiration date and/or a state of shared data (for example, deletion, corruption, etc.). According to various embodiments, the second contract may include various data in addition to the above-described data.

According to an embodiment, the processor 113 may electronically sign with a private key of a person making the second transaction, that is, the user of the electronic device 110, through the key manager 322. For example, the processor 113 may sign a second transaction hash with the private key of the user of the electronic device 110 through the key manager 322, and may add the same to second transaction signature data.

According to an embodiment, the processor 113 may electronically sign with an attestation key of the user of the electronic device 110 through the key manager 322 in order to attest reliability of the second transaction. According to an embodiment, the attestation key may correspond to the attestation key described with reference to FIG. 3. According to an embodiment, the processor 113 may sign the second transaction hash with the attestation key of the user of the electronic device 110 through the key manager 322, and may add the same to the second transaction signature data.

According to an embodiment, the processor 113 may generate a proposal block based on the second transaction and the second contract through the blockchain platform 323, by executing the data sharing APP 321, and may examine validity of the proposal block. The blockchain platform 323 may synchronize the proposal block, and a block receiver receiving the proposal block may examine whether the proposal block is valid, through the blockchain platform 333. Certifying and synchronizing the block will be described in detail with reference to FIG. 13.

According to an embodiment, the blockchain platform 333 of the external electronic device 120 which receives the shared data may perform the second contract based on the second transaction generated in the blockchain network 310. When the second contract is performed, the blockchain platform 333 may record world state data regarding the second contract on a world state of a ledger of the blockchain network 310. According to an embodiment, the communication circuit 122 may download encrypted sharing data through the server 300. In an embodiment, the processor 123 may store the encrypted data in an internal repository. In an embodiment, the internal repository may indicate an internal repository of the data sharing APP 331 that can be accessed through the data sharing APP 331. In an embodiment, the internal repository of the data sharing APP 331 may be included in the memory 121.

According to an embodiment, the user of the external electronic device 120 may access the encrypted data which is downloaded from the server 300. In an embodiment, when the user of the external electronic device 120 accesses the encrypted data, the data sharing APP 331 may decrypt the encrypted data. According to an embodiment, the user of the external electronic device 120 may decrypt the data encrypted with the public key of the user of the electronic device 110. Although it is illustrated in the disclosure for convenience of explanation that data to share is encrypted with the public key of the user of the electronic device 110 which shares data, any symmetric key that is known to the external electronic device 120 which receives shared data and the electronic device 110 which shares data may be used.

According to an embodiment, when the user of the external electronic device 120 which receives shared data reads the shared data, the blockchain platform 333 may generate a third transaction regarding reading of the data. According to an embodiment, the third transaction may generate a third contract (for example, a third smart contract) containing information regarding reading of the data. According to an embodiment, the third contract may include various data. For example, the third contract include at least one of an address of a person who reads data, a blockchain network ID that shares data, a unique ID regarding shared data, and/or a time at which data is read. According to various embodiments, the third contract may include various data in addition to the above-described data.

According to an embodiment, the processor 123 may electronically sign with a private key of the user of the external electronic device 120 which generates the third transaction, through the key manager 332. For example, the processor may sign a third transaction hash with the private key of the user of the external electronic device 120, and may add the same to third transaction signature data.

According to an embodiment, the processor 123 may electronically sign with an attestation key of the user of the external electronic device 120 through the key manager 322 in order to attest reliability of the third transaction. According to an embodiment, the processor 123 may sign the third transaction hash with the attestation key of the user of the external electronic device 120 through the key manager 332, and may add the same to the third transaction signature data.

According to an embodiment, the processor 123 may generate a proposal block based on the third transaction and the third contract through the blockchain platform 333, by executing the data sharing APP 331, and may examine validity of the proposal block. The blockchain platform 333 may synchronize the proposal block, and a block receiver receiving the proposal block may examine whether the proposal block is valid through the blockchain platform 323. Certifying and synchronizing the block will be described below with reference to FIG. 13.

According to an embodiment, the blockchain platform 323 of the electronic device 110 may perform the third contract based on the third transaction generated in the blockchain network 310. When the third contract is performed, the blockchain platform 323 may record world state data regarding the third contract on the world state of the ledger of the blockchain network 310. In an embodiment, the user of the electronic device 110 which shares data may identify that the user of the external electronic device 120 receiving shared data reads the data, based on the data regarding the third contract, by using the data sharing APP 321.

Although the disclosure is illustrated based on the assumption that the user of the electronic device 110 included in the blockchain network 310 shares data, for convenience of explanation, the external electronic device 120 may share data using the blockchain network 310. When data is shared by the external electronic device 120, the second transaction may be generated by the blockchain platform 333 of the external electronic device 120. In addition, the second transaction may be electronically signed with a private key of the user of the external electronic device 120. On the other hand, the third transaction may be generated by the blockchain platform 323 of the electronic device 110. In addition, the third transaction may be electronically signed with the private key of the user of the electronic device 110.

Figure 10:
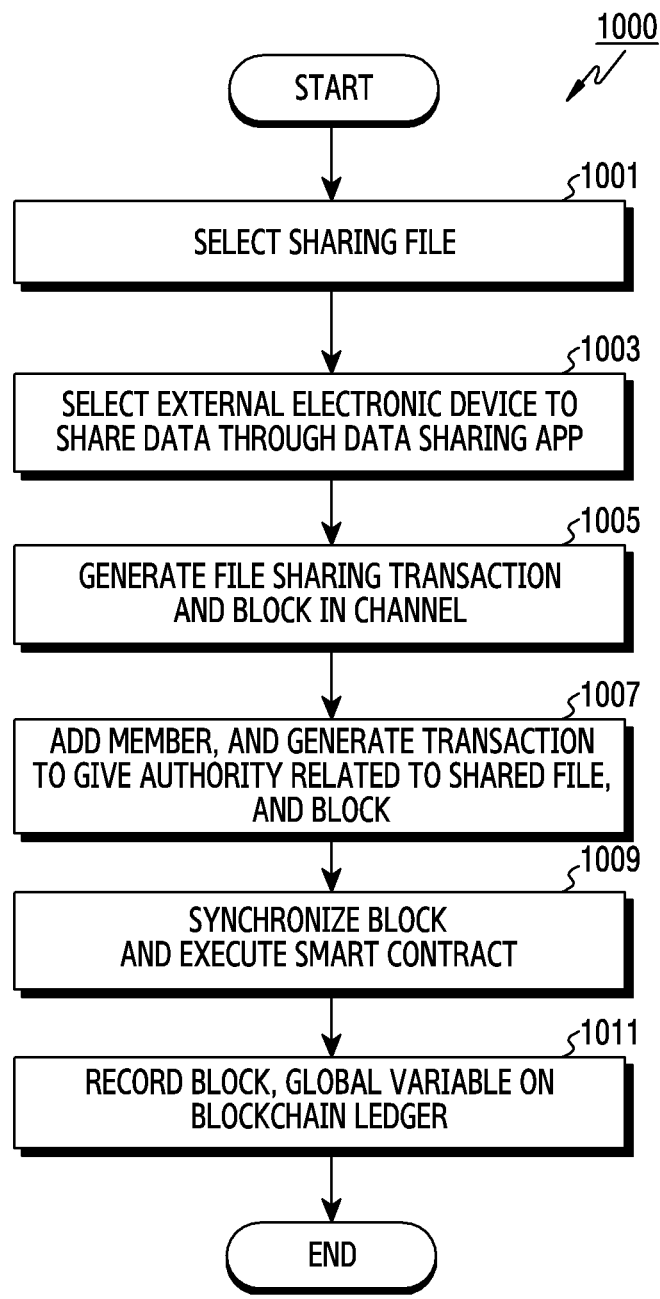
FIG. 10 is a flowchart illustrating a data sharing operation of an electronic device according to an embodiment.

FIG. 10 is a flowchart 1000 illustrating an operation of sharing data in an electronic device according to an embodiment.

In operation 1001, the user of the electronic device (e.g., electronic device 110) described above with reference to FIG. 1 according to an embodiment may select a sharing file to share with the user of the external electronic device described with reference to FIG. 1. In various embodiments, the sharing file may be data of various formats. For example, the sharing file may include a photo, a video, and/or a document.

In operation 1003, the user of the electronic device according to an embodiment may select an external electronic device to share data therewith through the data sharing APP (e.g., data sharing APP 321) described with reference to FIG. 3. In various embodiments, the user of the electronic device may select a plurality of external electronic devices. According to an embodiment, selecting the external electronic device to share data may indicate selecting a blockchain network including the electronic device and the external electronic device to share data as blockchain nodes. According to an embodiment, when the blockchain network including at least one external electronic device to share data as a blockchain node is already generated, the user of the electronic device may select the blockchain network in operation 1003. According to another embodiment, when the blockchain network including at least one external electronic device to share data as a blockchain node is not generated, the user of the electronic device may generate the blockchain network by performing the operations described with reference to FIG. 3.

According to an embodiment, in operation 1005, the blockchain platform (e.g., blockchain platform 323) described with reference to FIG. 3 may share data with the blockchain network (blockchain channel) including the electronic device and the external electronic device to share data as blockchain nodes, and may generate a file sharing transaction and a block. The file sharing transaction may indicate the second transaction described with reference to FIG. 9.

According to an embodiment, in operation 1007, the blockchain platform may add the user of the external electronic device to share data to the blockchain network (channel) as a member, and may generate a transaction to give authority to the shared file and may generate a block based on the transaction. For example, the blockchain platform may generate a reading expiration time, re-sharing authority, etc. for the shared file as a transaction.

In an embodiment, in operation 1009, the blockchain platform may synchronize the generated block and may execute a smart contract based on the generated block. According to an embodiment, the smart contract may be executed based on a consensus algorithm of blockchain nodes included in the blockchain network.

According to an embodiment, in operation 1011, the blockchain platform may register the block at a blockchain ledger of the blockchain network (channel) in which the electronic device shares the file, and may record data on the transaction and the smart contract on a world state.

Figure 11:
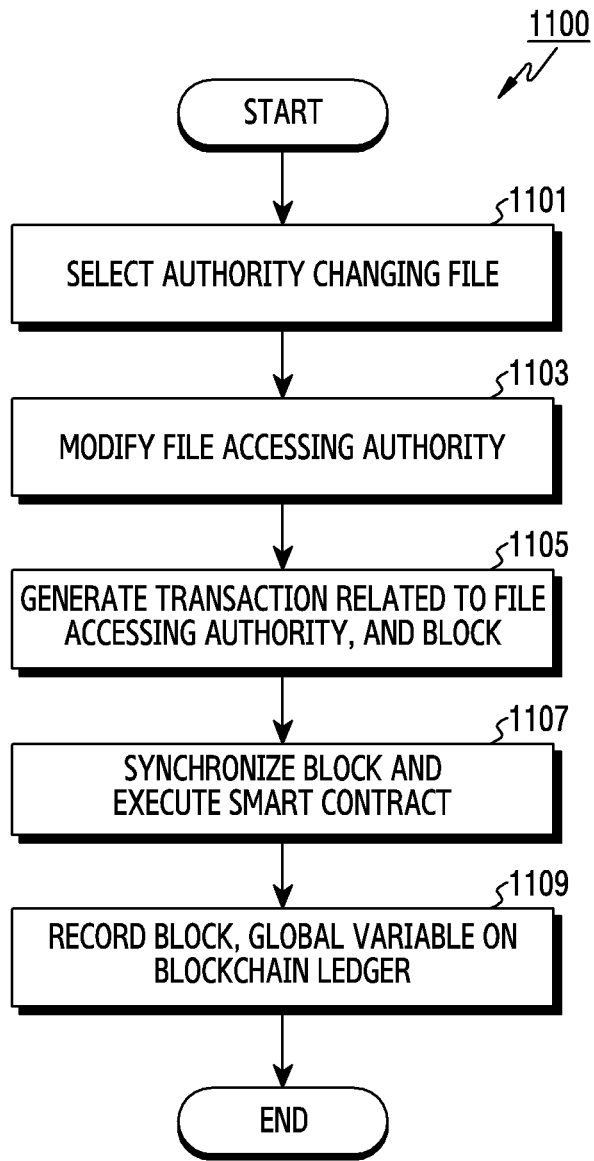
FIG. 11 is a flowchart illustrating an operation of changing authority on a shared data of an electronic device according to an embodiment.

FIG. 11 is a flowchart 1100 illustrating an operation of changing authority regarding shared data in an electronic device according to an embodiment.

Referring to FIG. 11, in operation 1101, the user of the electronic device (e.g., electronic device 110) described with reference to FIG. 3 may select a file to change authority among shared files through the data sharing APP (e.g., data sharing APP 321) described with reference to FIG. 3. For example, the user of the electronic device may select the file to withdraw or modify authority of the external electronic device related to the shared file. In an embodiment, in operation 1103, the user of the electronic device may modify authority to access the selected file in operation 1103. For example, the user of the electronic device may prohibit the external electronic device from accessing the selected file, or may re-set a file accessing expiration date.

According to an embodiment, in operation 1105, the blockchain platform (e.g., blockchain platform 323) of the electronic device described with reference to FIG. 3 may generate a transaction regarding changing of file authority. In operation 1105, the blockchain platform may generate a smart contract based on the transaction. According to an embodiment, smart contract data may include a unique ID regarding the shared file, a file sharing blockchain network (blockchain channel), a data related to file accessing authority. According to an embodiment, the blockchain platform may transmit a symmetric key which is used for encrypting the shared file as a null value in the file authority changing transaction, and may control the shared file not to be decrypted.

According to an embodiment, the processor (e.g., processor 113) of the electronic device described with reference to FIG. 3 may sign a transaction hash with a private key of the user of the electronic device which generates the file authority changing transaction through the key manager described with reference to FIG. 3, and may add the transaction hash to transaction signature data. In addition, the processor of the electronic device may sign the transaction hash with an attestation key of the user of the electronic device, and may add the transaction hash to the transaction signature data, in order to attest reliability of the file authority changing transaction through the key manager.

In an embodiment, in operation 1107, the blockchain platform of the electronic device described with reference to FIG. 3 may generate a block based on the file authority changing transaction, and may synchronize the block. In addition, the blockchain platform may execute the smart contract based on the file authority changing transaction. According to an embodiment, in operation 1107, the blockchain platform may execute the smart contract by executing the file authority changing transaction, and may record a result of performing the smart contract. According to an embodiment, in operation 1109, the blockchain platform may record the block based on the file authority changing transaction on the blockchain ledger of the blockchain network in which the file the authority of which is changed is shared, and may record the smart contract data on the world state.

Figure 12:
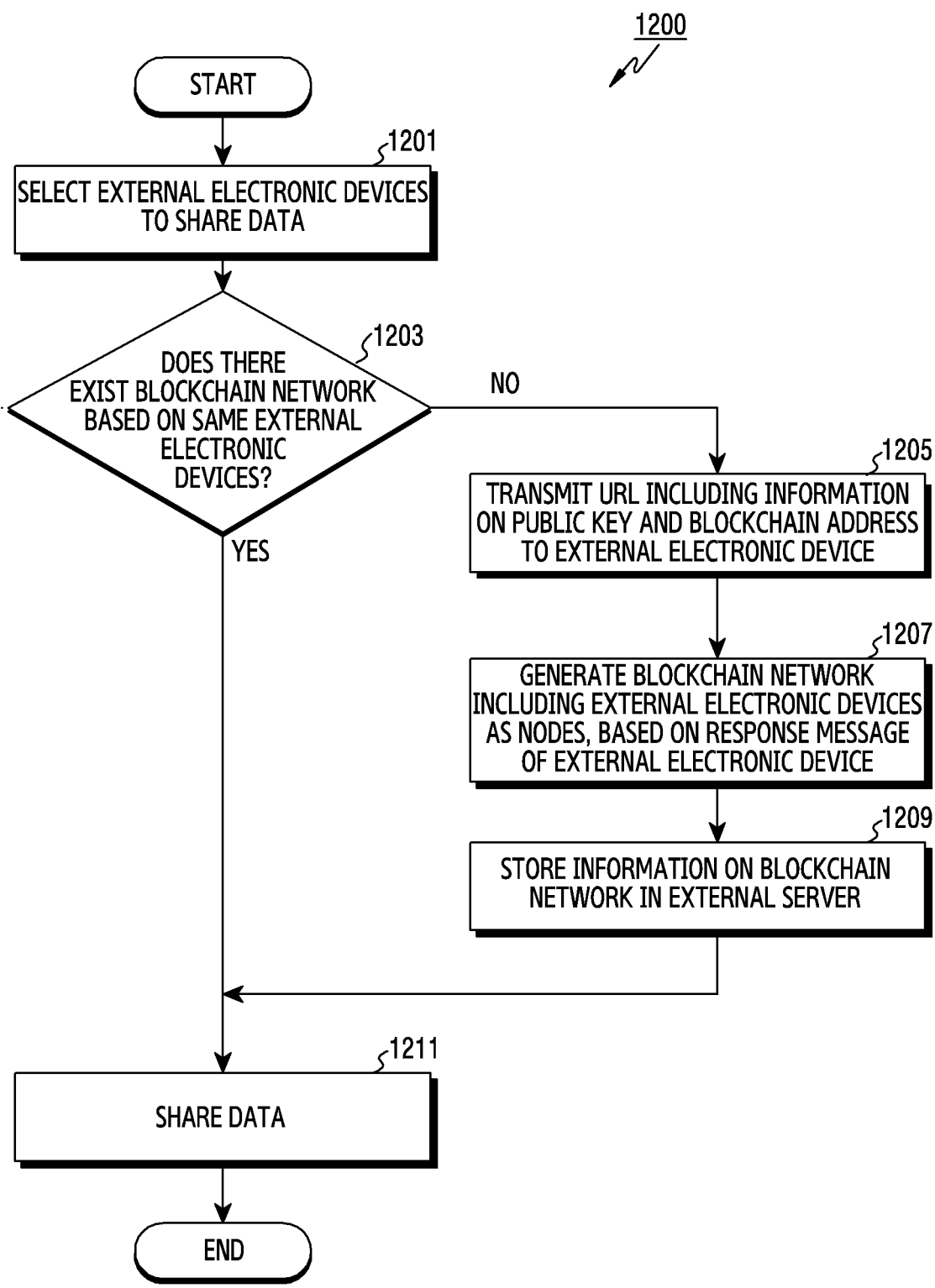
FIG. 12 is a flowchart illustrating an operation of determining whether to generate a blockchain network in an electronic device according to an embodiment.

FIG. 12 is a flowchart 1200 illustrating an operation of determining whether to generate a blockchain network in an electronic device according to an embodiment.

Referring to FIG. 12, in operation 1201, the user of the electronic device described with reference to FIG. 3 may select external electronic devices to share data. A method of selecting external electronic devices to share data may include one of various methods, of which non-limiting examples are described with reference to FIGS. 4 to 6. According to an embodiment, in operation 1203, the processor (e.g., processor 113) may determine whether there already exists a blockchain network based on the same external electronic devices as the selected external electronic devices. That is, in order to share data, it may be determined whether there already exists a blockchain network before the blockchain network is generated through the data sharing APP described with reference to FIG. 3. For example, the processor may determine whether there already exists a blockchain network through channel information stored in the blockchain platform, based on a genesis block shared through an operation of inviting the selected external electronic devices. In an embodiment, the genesis block may indicate a first block that is generated in the blockchain network as a block for generating a blockchain network, that is, a channel.

According to an embodiment, when there already exists the blockchain network including the electronic device and the selected external electronic devices as blockchain nodes, the processor may share data to share with the existing blockchain network.

According to an embodiment, when there does not exist the blockchain network, the processor may transmit an invitation URL including information regarding a public key and a blockchain address to the external electronic device through the server described with reference to FIG. 3 in operation 1205. According to an embodiment, the processor may generate a public key of the user of the electronic device through the key manager of the electronic device described with reference to FIG. 3, and may generate a blockchain address based on the public key. According to an embodiment, the blockchain network may be indicated by the blockchain address.

According to an embodiment, in operation 1207, the blockchain platform of the electronic device may generate a blockchain network including the external electronic devices as nodes, based on a response message of the external electronic devices, by performing the operations described with reference to FIG. 3. According to an embodiment, when respective users of the external electronic devices receiving the invitation URL want to share data with the user of the electronic device, a response message including acceptance data may be transmitted to the electronic device. In an embodiment, the response message may indicate acceptance data described with reference to FIG. 3.

According to an embodiment, in operation 1209, the processor may store information regarding the blockchain network in an external server through the communication circuit described with reference to FIG. 1. In an embodiment, the information regarding the blockchain network may include at least one of information of the respective users of the external electronic devices joining in sharing data through the blockchain network, a blockchain network (blockchain channel) ID, a blockchain address.

According to an embodiment, since the blockchain network including the electronic device and the selected external electronic devices as blockchain nodes is generated, the processor may share the data to share with the existing blockchain network in operation 1211.

Figure 13:
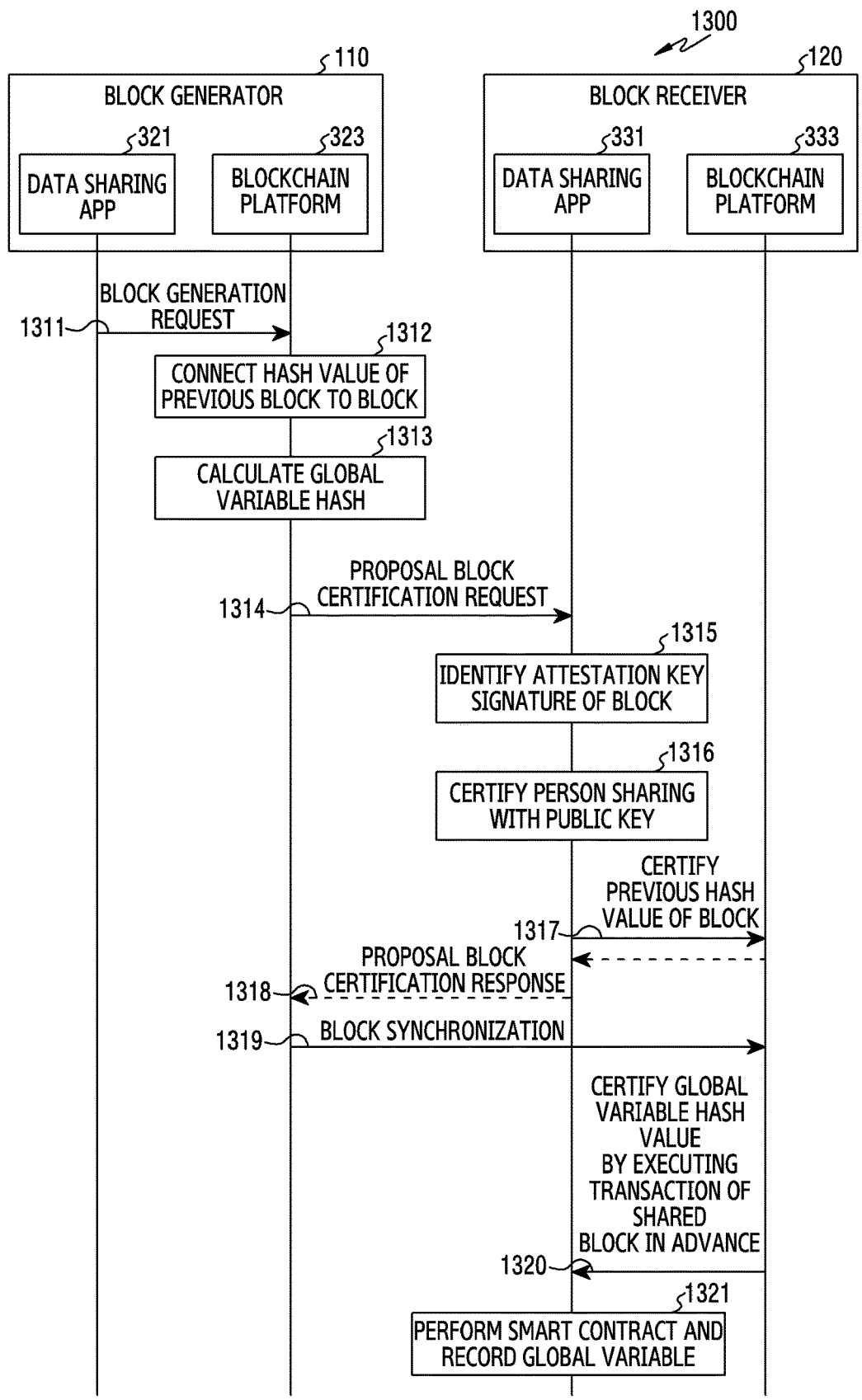
FIG. 13 is a view to explain operations of certifying and synchronizing a block through a blockchain platform according to an embodiment.

FIG. 13 is a view to explain operations of certifying and synchronizing a block through a blockchain platform according to an embodiment.

Referring to FIG. 13, a block sharing system 1300 may include a block generator 110 for generating a block and a block receiver 120 for receiving the generated block on a blockchain network. The block generator 110 and the block receiver 120 may correspond to the electronic device 110 or the external electronic device 120 according to a type of the generated block. According to an embodiment, the block generator 110 may include a data sharing APP 321 and a blockchain platform 323. Likewise, the block receiver 120 may include a data sharing APP 331 and a blockchain platform 333.

According to an embodiment, the block sharing system 1300 may refer to a system that shares a block which is generated in a process of generating a blockchain network, storing information regarding the blockchain network, and adding blockchain nodes included in the blockchain network, and in a process of sharing data and changing (e.g., withdrawing) authority on the data. According to an embodiment, the block sharing system 1300 may include a process of generating, by the block generator 110, a proposal block, and receiving certification on whether the proposal block is valid from the block receiver 120, and then synchronizing the proposal block. The block receiver 120 may identify whether the block is valid and then may perform a transaction of the block to reflect transaction data on a world state of a ledger included in the blockchain network. In an embodiment, the block generator 110 and the block receiver 120 of the block sharing system 1300 may know information of each other's public keys in the process of generating the blockchain network.

According to an embodiment, the data sharing APP 321 may request the blockchain platform 323 to generate a block (1311). In an embodiment, the block may indicate a block which is based on various types of transactions. For example, when the user who shares data through the data sharing APP 321 generates a file authority changing transaction to withdraw authority on the shared data, the blockchain platform 323 may be requested to generate the block, based on the file authority changing transaction (1311).

According to an embodiment, the blockchain platform 323 may connect a hash value of a previous block to the block (1312). In an embodiment, the hash value of the previous block may be recorded on a previous hash value of a proposal block. According to an embodiment, the hash value may indicate a hash value which is generated by using a hash function.

In an embodiment, the blockchain platform 323 may calculate a world state data hash by performing a smart contract with a transaction of a proposal block requested to be generated (1313). For example, the blockchain platform 323 may calculate a hash of world state data after performing the smart contract based on the transaction by executing the transaction in the proposal block, and may record the hash on the proposal block.

In an embodiment, the block generator 110 may request the block receiver 120 to certify the proposal block, which is requested to be generated, through the blockchain platform 323 (1314). According to an embodiment, the block receiver 120 may execute the data sharing APP 331, and may perform a certification operation by identifying a certification chain and electronic signature data included in the proposal block requested to be generated. That is, the data sharing APP 331 may identify the reliable device and application by identifying an attestation key signature of the block (1315).

In an embodiment, the block receiver 120 may decrypt the proposal block with the public key of the block generator 110 known thereto, and may certify the block generator 110. That is, the data sharing APP 331_may certify a person who shares the block by certifying the proposal block encrypted with a private key of the person sharing the block, by using a public key of the person sharing the block (1316).

According to an embodiment, the data sharing APP 331 may request the blockchain platform 333 to identify whether a previous hash value of the proposal block matches the hash value of the last block that the block receiver 120 has on the blockchain network, through the previous hash value of the proposal block. The data sharing APP 331 may request the blockchain platform 333 to certify the previous hash value of the block (1317), and the blockchain platform 333 may respond after performing the certifying operation.

In an embodiment, the blockchain platform 333 may execute the transaction of the proposal block and perform the smart contract, and then, may identify whether the hash value of the world state is equal to a world state hash value of the proposal block. In an embodiment, the block receiver 120 may transmit a response indicating that the proposal block is certified to the block generator 110 (1318).

Based on the response of the block receiver 120, the proposal block requested to be generated through the block generator 110 may be synchronized (1319). In an embodiment, the blockchain platform 333 of the block receiver 120 may execute the transaction of the certified proposal block in advance and may certify the world state hash value (1320). For example, the blockchain platform may execute the transaction with the shared proposal block and may perform a smart contract based on the transaction, and may identify whether a hash value of the world state after the smart contract is performed is equal to the world state hash value of the proposal block. In an embodiment, when the hash value of the world state after the smart contract is performed is equal to the world state hash value of the proposal block, it may be certified that the proposal block is valid. In an embodiment, the block receiver 120 may execute a transaction of the valid block and may perform a smart contract, and may record smart contract resulting data on the world state (1321).

Figure 14:
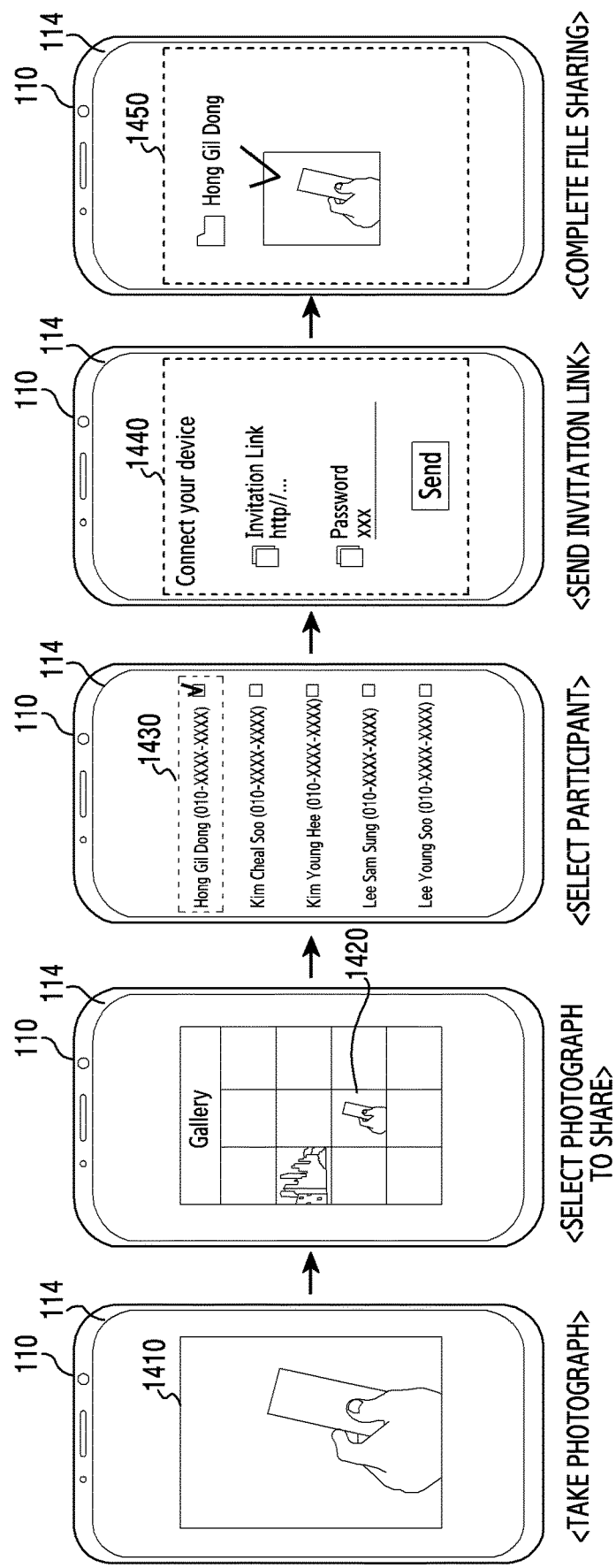
FIG. 14 is a view illustrating a data sharing user interface of an electronic device according to an embodiment.

FIG. 14 is a view illustrating a data sharing user interface of an electronic device according to an embodiment.

Referring to FIG. 14, the user of the electronic device 110 who intends to share data may take a photograph. The processor 113 may display the taken photograph 1410 through the display 114. According to an embodiment, the user of the electronic device 110 may identify the taken photograph 1410 through the display 114 by executing a gallery application. In an embodiment, the user of the electronic device 110 may execute the gallery application, and may select photograph data to share with a user of at least one external electronic device. For example, the user of the electronic device 110 may select the taken photograph 1410 as photograph data to share.

According to an embodiment, the processor 113 may select a target to share the taken photograph 1410 through the display 114. For example, the processor may select a user of an external electronic device to share data in the blockchain network 310 through the data sharing APP 321 described with reference to FIG. 3. According to various embodiments, the processor 113 may display information regarding a recipient to share data therewith through the display 114 by using various identifiers. For example, the identifier may include a name, a phone number, an address and/or a nickname. According to an embodiment, the processor 113 may control information displayed through the display 114 not to be captured. That is, the processor 113 may determine that information regarding recipients to share data is security information, and may control (e.g., disenable) a capturing operation so as not to leak the information displayed on the display 114.

According to an embodiment, when the user of the electronic device 110 selects a recipient 1430 to share the taken photograph 1410, the processor 113 may generate an invitation message 1440 including an invitation URL. In an embodiment, the invitation URL included in the invitation message 1440 may include signature data which is electronically signed with a private key and an attestation key of the user of the electronic device 110. In addition, the invitation URL may include an invitation ID, a public key and an address of the user of the electronic device 110. According to another embodiment, when the blockchain network 310 in which data can be shared with the recipient 1430 is already generated, the operation of generating the invitation message 1440 and transmitting may be omitted. In an embodiment, the processor 113 may output the generated invitation message 1440 through the display 114.

According to an embodiment, based on a response of the recipient 1430 to the invitation message 1440, the blockchain network may be generated. In an embodiment, the processor 113 may share the taken photograph 1410 through the server 300. Accordingly, the processor 113 may output, through the display 114, a sharing completion notification 1450 indicating that the taken photograph 1410 is shared with the recipient 1430.

Figure 15:
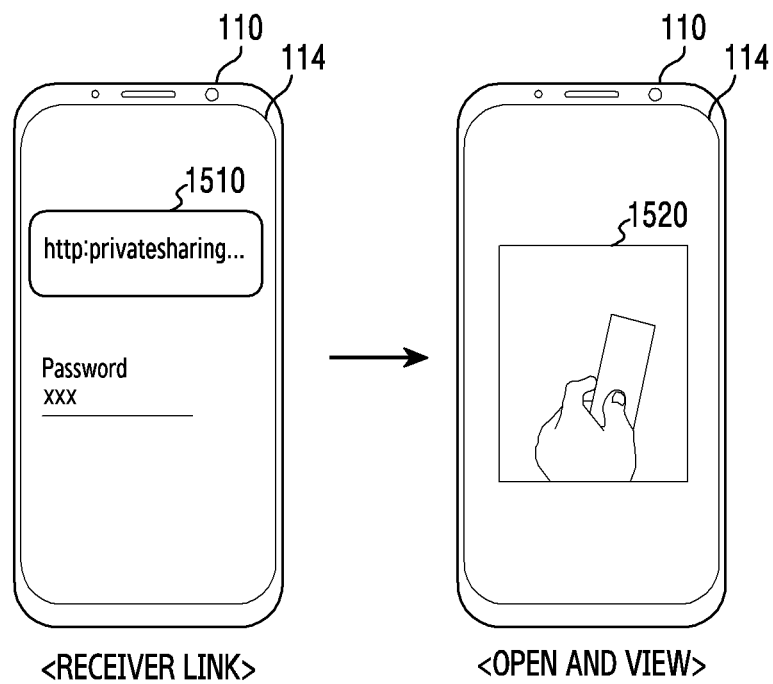
FIG. 15 is a view illustrating a user interface of an electronic device which receives shared data according to an embodiment.

FIG. 15 is a view illustrating a user interface of an electronic device which receives shared data according to an embodiment.

Referring to FIG. 15, the user of the electronic device 110 may receive shared data from the external electronic device 120. According to an embodiment, the electronic device 110 may receive an invitation message for sharing data through the data sharing APP 321 described with reference to FIG. 3, from the external electronic device 120. The processor 113 may display the invitation message including an invitation URL 1510 through the display 114. According to various embodiments, the invitation URL 1510 may be received based on various forms. For example, the invitation URL 1510 may be received based on a form of a notification through the data sharing APP 321 in addition to the form of the invitation message.

According to an embodiment, the processor 113 may execute the data sharing APP 321 through the invitation URL 1510, and identify shared data 1520. According to an embodiment, the processor 113 may display the shared data 1520 through the display 114. In an embodiment, the blockchain platform 323 described with reference to FIG. 3 may generate a transaction regarding reading of the shared data 1520.

Figure 16:
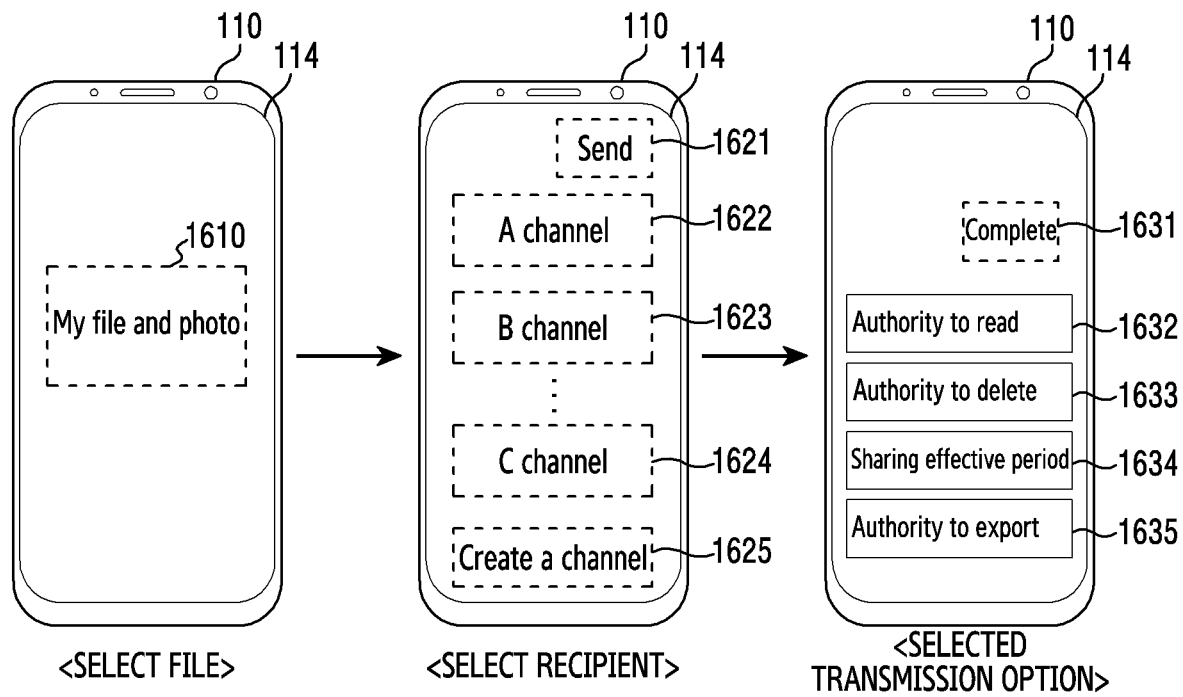
FIG. 16 is a view illustrating a user interface through which authority on shared data is set according to an embodiment.

FIG. 16 is a view illustrating a user interface which sets authority on shared data according to an embodiment.

Referring to FIG. 16, the user of the electronic device 110 who intends to share data may select a file and photo 1610 to share. According to an embodiment, the processor 113 may execute the data sharing APP 321 described with reference to FIG. 3, and may output the file and photo 1610 through the display 114. According to an embodiment, the processor 113 may output a plurality of blockchain networks (blockchain channels) for sharing data generated based on the data sharing APP 321. In an embodiment, when there already exists a blockchain network generated with a recipient with whom data is to be shared, the user of the electronic device 110 may select one blockchain network from the plurality of blockchain networks 1622 to 1624. In another embodiment, when there does not exist the blockchain network generated with the recipient with whom data is to be shared, the user of the electronic device 110 may select a "Create Channel" 1625 displayed through the display 114. When the user selects the "Create Channel" 1625, the processor 113 may generate a blockchain network through the blockchain platform 323 described with reference to FIG. 3.

According to an embodiment, the user of the electronic device 110 selects the blockchain network to share data, and may select a "Send" 1621 displayed through the display 114. In an embodiment, the processor 113 may transmit the photo and file 1610 to share to the recipient through the selected blockchain network.

According to an embodiment, the processor 113 may output displays 1631 to 1635 through the display 114 to allow the user of the electronic device 110 to set authority on the photo and file 1610 to be shared. In an embodiment, the user of the electronic device 110 may set authority on the photo and file 1610 to be shared, by selecting one items from authority setting displays 1632 to 1635 of the photo and file 1610 to be shared, and select a completion display 1631. For example, items corresponding to the authority setting displays 1632 to 1635 may include an authority to read the shared data (1632), a period in which data sharing is allowed (1634), and an authority to export the shared data (1635). According to an embodiment, the user of the electronic device 110 may control authority on the shared file in the blockchain network 310, by generating an authority setting transaction through the blockchain platform 323 based on the set authority, and performing the authority changing operation described with reference to FIG. 11.

According to various embodiments, the user of the electronic device 110 who shares the file and photo 1610 may change the authority on the shared file at a time as the user wants when sharing the file or even after sharing the file.

Figure 17:
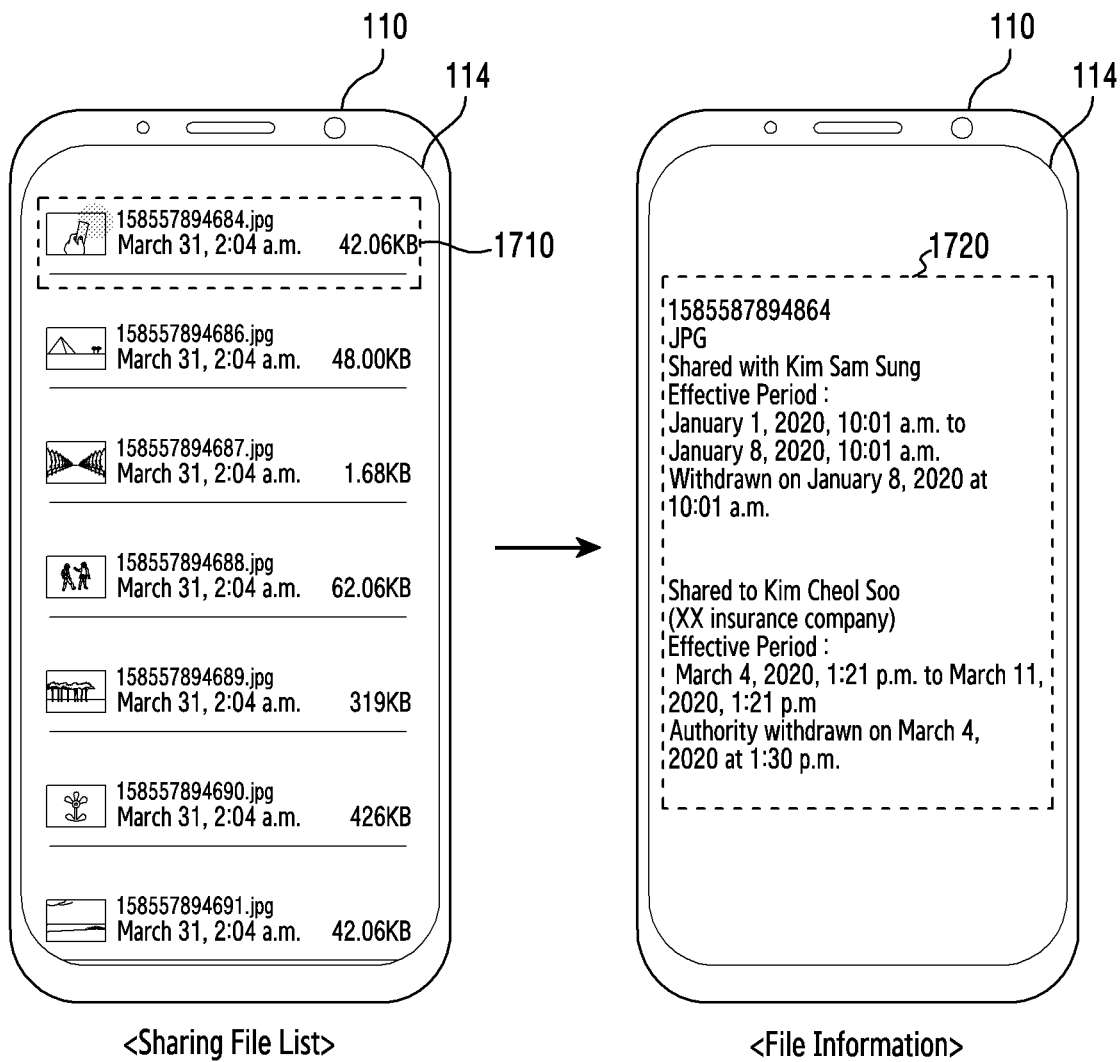
FIG. 17 is a view illustrating a user interface which provides file information of a file shared through a data sharing application according to an embodiment.

FIG. 17 is a view illustrating a user interface of providing file information of a file shared through a data sharing application according to an embodiment.

Referring to FIG. 17, the processor 113 may execute the data sharing APP 321 described with reference to FIG. 3, and may output a list of sharing files which are shared or received through the data sharing APP 321, through the display 114.

According to an embodiment, the display 114 may display the list of sharing files including, for example but not limited to, brief summaries of the sharing files, sharing file names, latest modification information of the sharing files, and/or capacities of the sharing files.

According to an embodiment, the user of the electronic device 110 may select a file to view information from the list of sharing files. For example, the user of the electronic device 110 may identify file information of a first sharing file by selecting the first sharing file 1710 through the display 114.

According to an embodiment, the processor 113 may output file information of the file selected by the user of the electronic device 110 through the display 114. For example, the processor 113 may output file information 1720 of the first sharing file 1710 through the display 114.

According to various embodiments, the file information 1720 may include a variety of information regarding the sharing file. For example, the file information 1720 may include a file name, a file type, a fine thumbnail, an address of a blockchain network which shares the file, a name of a file recipient, a file sharing expiration date, and/or a file authority withdrawal date.

Figure 18:
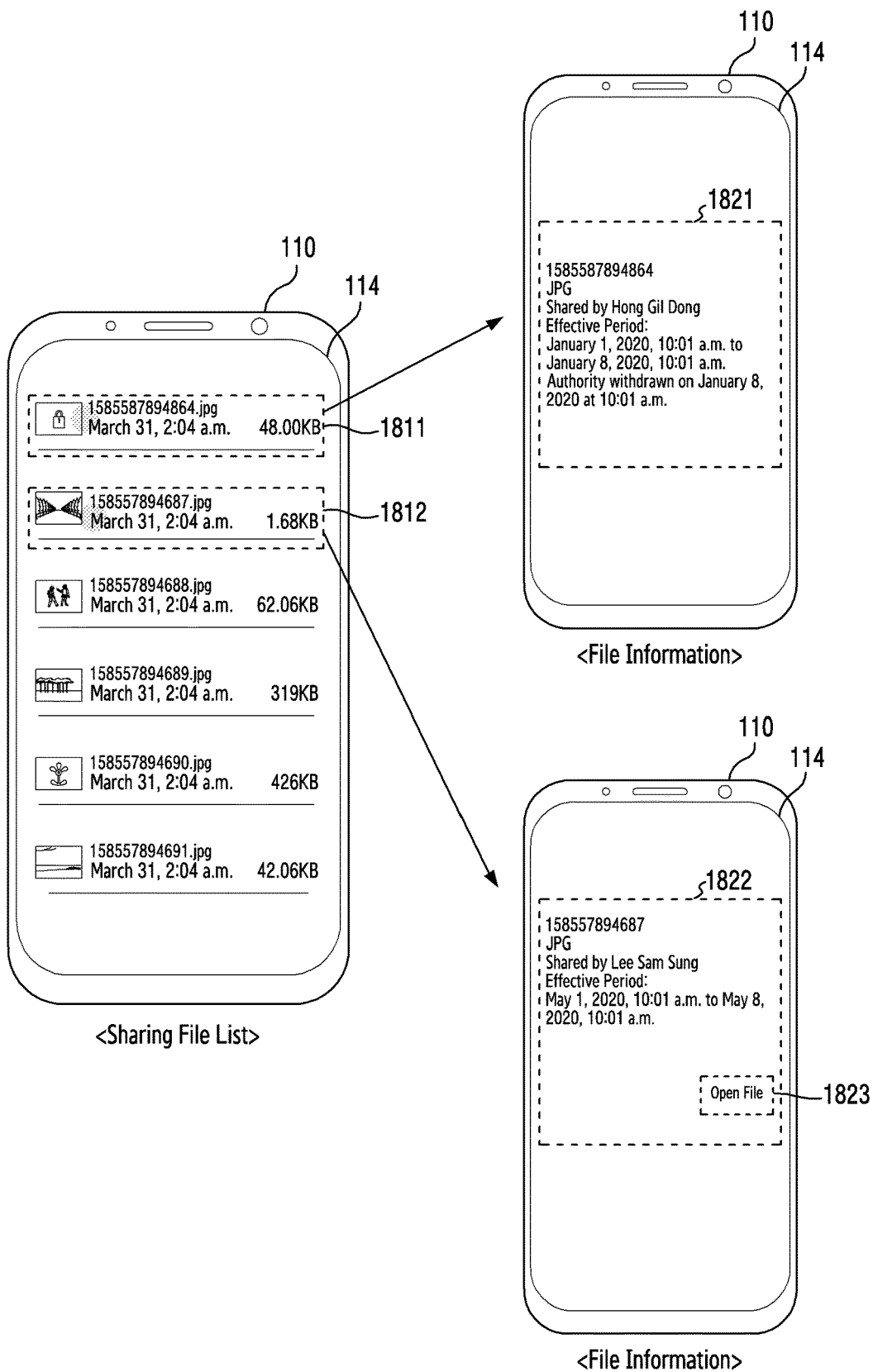
FIG. 18 is a view illustrating a user interface through which authority of a file shared through a data sharing application is changed according to an embodiment.

FIG. 18 is a view illustrating a user interface that allows for changing of authority of a file shared through a data sharing application according to an embodiment.

Referring to FIG. 18, the processor 113 may execute the data sharing APP 321 described with reference to FIG. 3, and may output a list of sharing files which are shared or received through the data sharing APP 321, through the display 114.

According to an embodiment, the display 114 may display the list of sharing files including brief summaries of the sharing files, sharing file names, latest modification information of the sharing files, and/or capacities of the sharing files. According to an embodiment, the display 114 may display information regarding a file, authority of which is deleted, and which cannot be read in the list of sharing files. According to an embodiment, the processor 113 may output the list of sharing files including a file 1811, authority of which is withdrawn, and which cannot be read, and a file 1812 which can be read, through the display 114.

According to an embodiment, the user of the electronic device 110 may select a file to read information of the selected file from the list of sharing files. For example, the user of the electronic device 110 may identify first file information 1821 of the file 1811 that cannot be read, by selecting the file 1811 that cannot be read from the list of sharing files, through the display 114. According to an embodiment, the first file information 1821 may include a variety of information. For example, the first file information 1821 may include a file name, a file type, a file thumbnail, a name of a blockchain network which shares the file, a file sender, a file recipient, file recipient's authority to read, a sharing expiration date, file recipient's authority to delete, authority to change an encrypted file, and/or a file sharing date. According to an embodiment, the user of the electronic device 110 may identify that the authority to read the shared file (e.g., authority set for the user of the electronic device 110 to read the shared file) is deleted, through the first file information 1821 displayed on the display 114.

According to an embodiment, the user of the electronic device 110 may select the file 1812 that can be read from the list of sharing files through the display 114. Accordingly, the user of the electronic device 110 may identify second file information 1822 of the file 1812 that can be read, by selecting the file 1812 which can be read from the list of sharing files, through the display 114. According to an embodiment, the second file information 1822 may include types of information similar to those of information included in the first file information 1821.

According to an embodiment, the processor 113 may output the second file information 1822 and a "Open File" display 1823 through the display 114. For example, the Open File" display 1823 may include a selectable item such as an icon. According to an embodiment, when the second file information 1822 corresponds to information regarding the file 1812 that can be read, the processor 113 may control to open the file 1812 immediately. For example, when the user of the electronic device 110 selects the "Open File" display 1823 through the display 114, the shared file 1812 that can be read may be opened. According to an embodiment, when the user of the electronic device 110 reads the file, the processor 113 may generate a transaction based on the reading of the file, by referring to the blockchain platform described with reference to FIG. 3.

Figure 19:
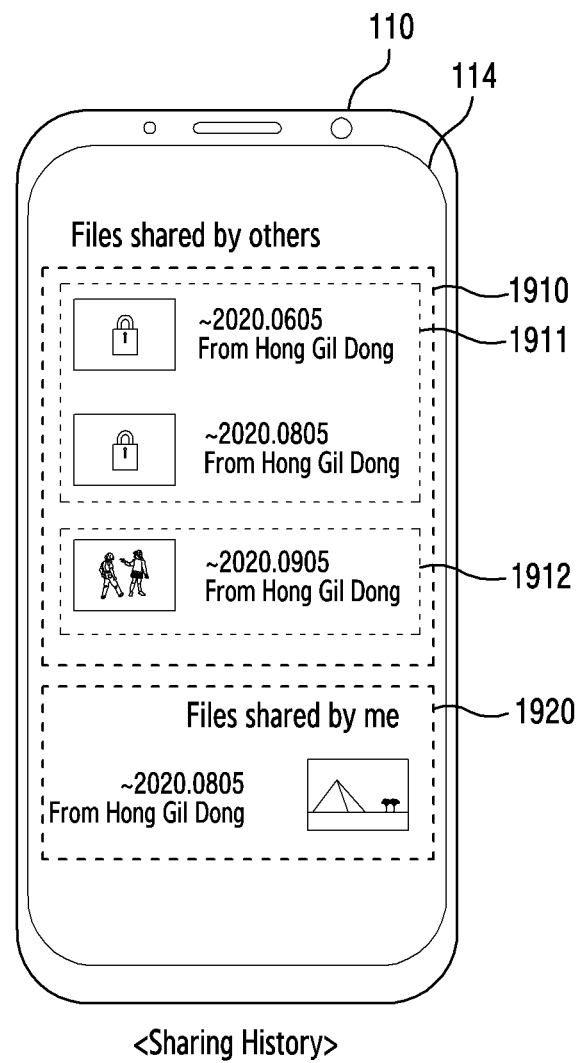
FIG. 19 is a view illustrating a user interface which provides a sharing history of a file shared through a data sharing application according to an embodiment.

FIG. 19 is a view illustrating a user interface which provides a sharing history of a file shared through a data sharing application according to an embodiment.

Referring to FIG. 19, the processor 113 may output a file sharing history through the display 114. For example, the processor 113 may display the file sharing history based on the data sharing APP 321 described with reference to FIG. 3 through the display 114. According to an embodiment, the processor 113 may control information displayed through the display 114 not to be captured. That is, the processor 113 may identify information regarding the file sharing history as security information, and may control (e.g., disenable) a capturing operation to prevent information displayed on the display 114 from leaking.

According to an embodiment, the display 114 may display both a "file shared by others" 1910 and a "file shared by me" 1920. For example, the "file shared by others" 1910 may include an authority withdrawal file 1911 and a readable file 1912. According to an embodiment, the user of the electronic device 110 may open the readable file 1912 among the "files shared by others" 1910 that are displayed through the display 114. According to an embodiment, the authority withdrawal file 1911 may indicate a file the authority of which is withdrawn under control of a person who shares the data. For example, the authority of the shared file may be withdrawn, based on the electronic device of the person who shares the data generating an authority changing transaction through the blockchain platform.

According to various embodiments, when the authority of a file is withdrawn, the processor 113 may indicate that the authority of the file is withdrawn, through the display 113, by using at least one of various contents (for example, a text, an image, a video, an icon, and/or symbol). For example, the processor 113 may control the display 114 to normally display an image (or any file representation) regarding a file having authority, and to hide an image corresponding to a normal file representation of a file the authority of which is withdrawn and instead display a lock-like shape image.

According to various embodiments, the processor 113 may output a file sharing history including a variety of file information through the display 114. For example, the processor may output a file sharing history including sharing expiration dates of the "file shared by other" 1910 and the "file shared by me" 1920, file thumbnails and/or file information related to file sharers.

Figure 20:
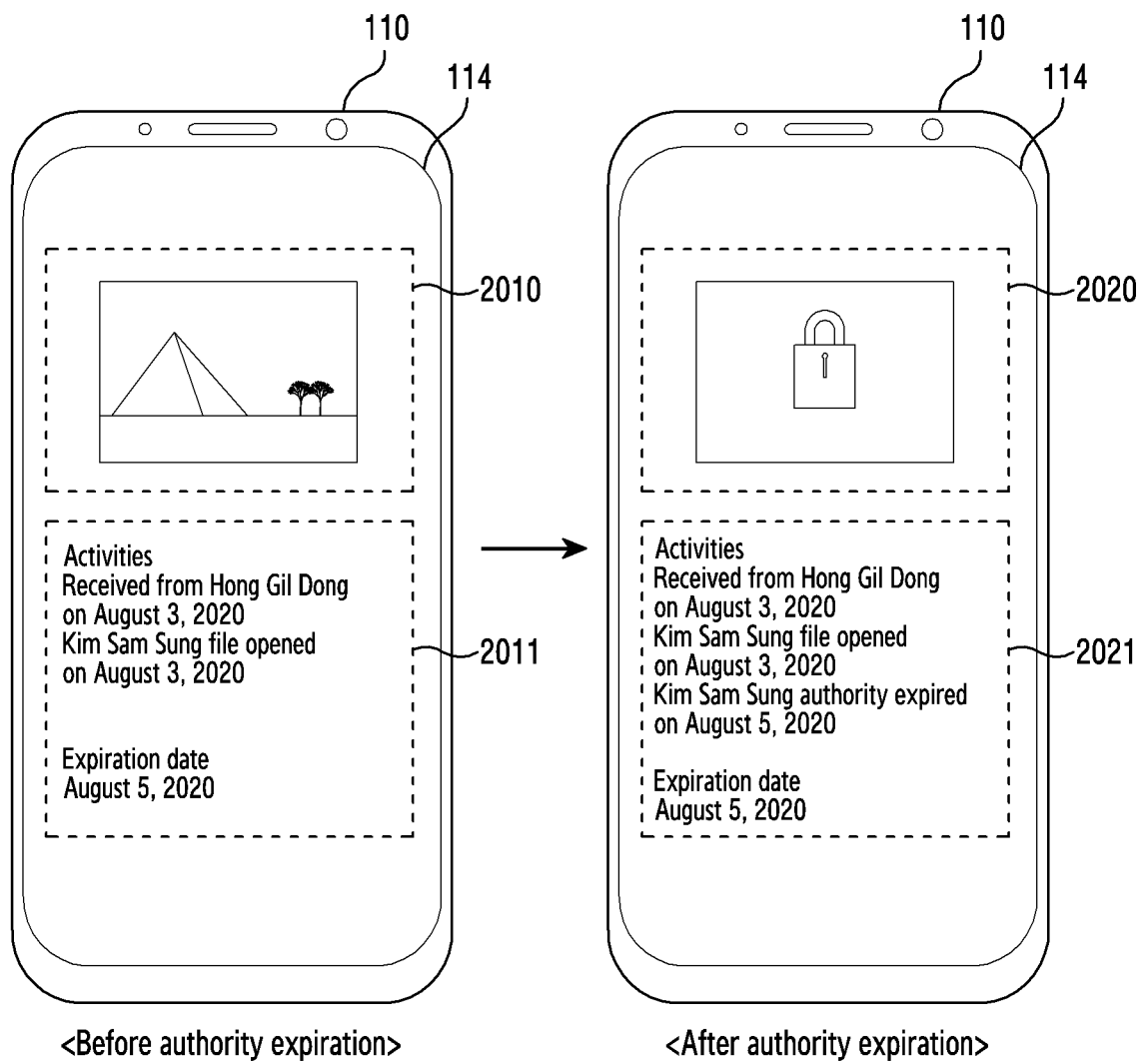
FIG. 20 is a view illustrating a user interface which indicates authority expiration of a file shared through a data sharing application according to an embodiment.

FIG. 20 is a view illustrating a user interface that indicates authority expiration of a file shared through a data sharing application according to an embodiment.

Referring to FIG. 20, the processor 113 may output a file shared through the data sharing APP 321 through the display 114. According to an embodiment, the shared file may indicate a "file before authority expiration" and a "file after authority expiration". According to an embodiment, the authority of the shared file may be determined by the operation of changing authority, described with reference to FIG. 11. For example, when the user of the electronic device which shares data withdraws or modifies the authority of the shared file, authority to access the shared file may be expired. In an embodiment, the authority of the shared file may be withdrawn, based on the electronic device of a person who shares the data generating an authority changing transaction through the blockchain platform.

According to an embodiment, the authority of the shared file may be changed as the file access expiration date elapses. For example, the shared file may be a "file before authority expiration" before the access expiration date of the shared file elapses, but may become a "file after authority expiration" when the expiration date elapses.

According to an embodiment, when the user of the electronic device 110 wants to read the "file before authority expiration", the processor 113 may display the "file before authority expiration" (e.g., any file representation indicating the "file before authority expiration") 2010 and the file sharing history (e.g., any form of information indicating the file sharing history) 2011 of the "file before authority expiration", described with reference to FIG. 19, through the display 114. In an embodiment, the file sharing history may include a variety of file information. For example, the "file before authority expiration" 2010 which is shared by others, and the file sharing history including a sharing effective period, a file thumbnail and/or file information regarding a file sharer may be outputted.

In an embodiment, the "file before authority expiration" 2010 may be displayed through the display 114 in the same manner the shared file is normally indicated (e.g., a normal graphical representation of the file). That is, the processor 113 may display the file shared by the data sharing APP 321 through the display 114 if the authority of the shared file is not expired.

According to an embodiment, when the authority to access the file is expired, the processor 113 may display a "file icon after authority expiration" 2020 and the file sharing history 2021 of "file after authority expiration", described with reference to FIG. 19, through the display 114. In an embodiment, the file sharing history may include a variety of file information. For example, the "file after authority expiration" which is shared by others, and the file sharing history including a sharing effective period, a file authority expiration date, a file authority expiration target, a file thumbnail, and/or file information related to a file sharer may be outputted.

In an embodiment, the processor 113 may display the "file icon after authority expiration" 2020 on the display 114, through at least one of various contents (for example, a text, an image, a video, an icon, and/or a symbol). That is, the "file after authority expiration" may not be displayed as the same manner the shared file is indicated, and may be displayed by using a content indicating the status of the "file after authority expiration". For example, the processor 113 may output the "file icon after authority expiration" 2020 in the form of a lock icon through the display 114. For example, the "file icon after authority expiration" 2020 may be displayed when the user of the electronic device 110 attempts to read the "file after authority expiration".

Figure 21:
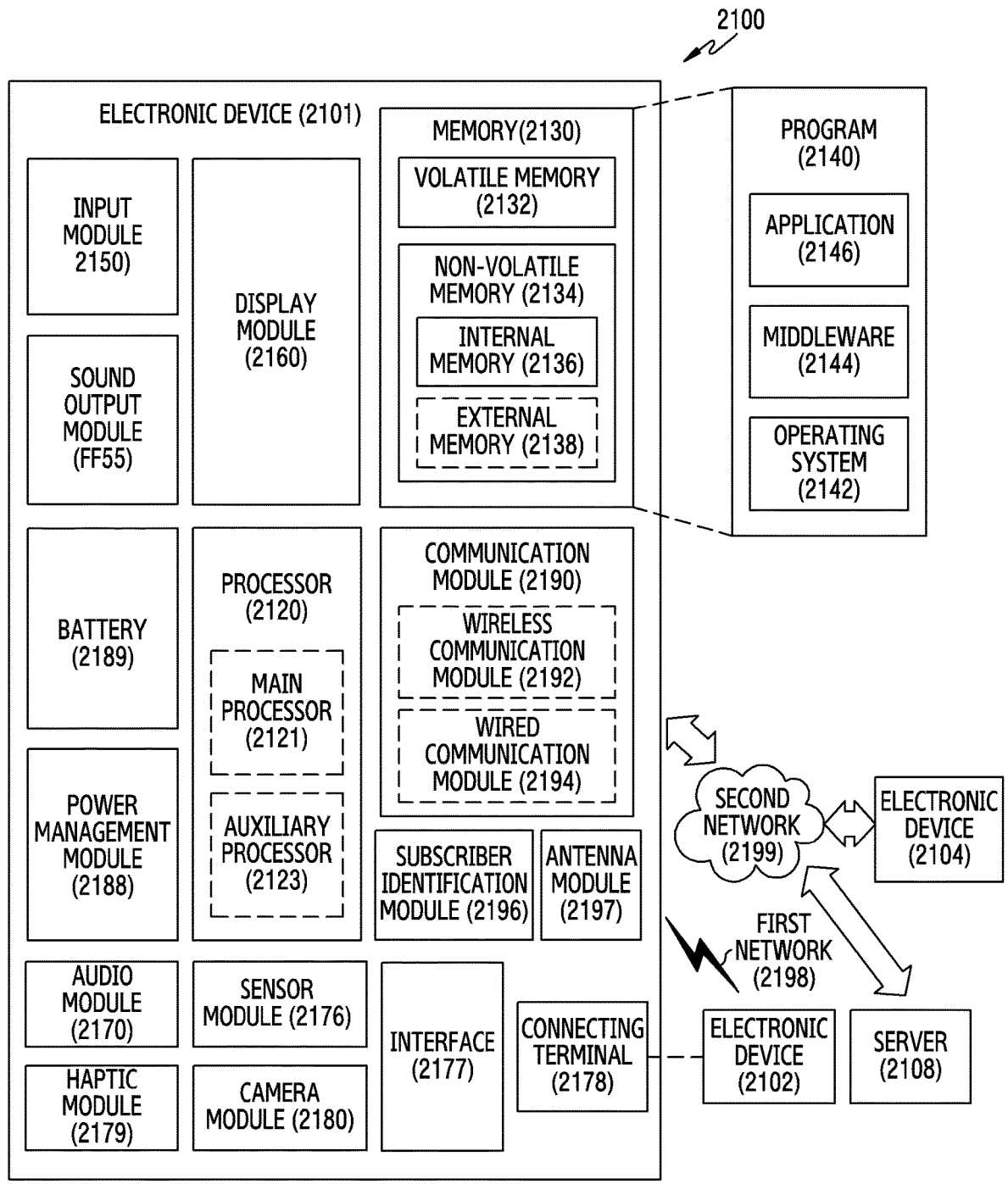
FIG. 21 is a block diagram illustrating an electronic device in a network environment according to various embodiments.

FIG. 21 is a block diagram illustrating an electronic device 2101 in a network environment 2100 according to various embodiments.

Referring to FIG. 21, the electronic device 2101 in the network environment 2100 may communicate with an electronic device 2102 via a first network 2198 (e.g., a short-range wireless communication network), or at least one of an electronic device 2104 or a server 2108 via a second network 2199 (e.g., a long-range wireless communication network). According to an embodiment, the electronic device 2101 may communicate with the electronic device 2104 via the server 2108. According to an embodiment, the electronic device 2101 may include a processor 2120, a memory 2130, an input module 2150, a sound output module 2155, a display module 2160, an audio module 2170, a sensor module 2176, an interface 2177, a connecting terminal 2178, a haptic module 2179, a camera module 2180, a power management module 2188, a battery 2189, a communication module 2190, a subscriber identification module (SIM) 2196, or an antenna module 2197. In some embodiments, at least one of the components (e.g., the connecting terminal 2178) may be omitted from the electronic device 2101, or one or more other components may be added in the electronic device 2101. In some embodiments, some of the components (e.g., the sensor module 2176, the camera module 2180, or the antenna module 2197) may be implemented as a single component (e.g., the display module 2160).

The processor 2120 may execute, for example, software (e.g., a program 2140) to control at least one other component (e.g., a hardware or software component) of the electronic device 2101 coupled with the processor 2120, and may perform various data processing or computation. According to one embodiment, as at least part of the data processing or computation, the processor 2120 may store a command or data received from another component (e.g., the sensor module 2176 or the communication module 2190) in volatile memory 2132, process the command or the data stored in the volatile memory 2132, and store resulting data in non-volatile memory 2134. According to an embodiment, the processor 2120 may include a main processor 2121 (e.g., a central processing unit (CPU) or an application processor (AP)), or an auxiliary processor 2123 (e.g., a graphics processing unit (GPU), a neural processing unit (NPU), an image signal processor (ISP), a sensor hub processor, or a communication processor (CP)) that is operable independently from, or in conjunction with, the main processor 2121. For example, when the electronic device 2101 includes the main processor 2121 and the auxiliary processor 2123, the auxiliary processor 2123 may be adapted to consume less power than the main processor 2121, or to be specific to a specified function. The auxiliary processor 2123 may be implemented as separate from, or as part of the main processor 2121.

The auxiliary processor 2123 may control at least some of functions or states related to at least one component (e.g., the display module 2160, the sensor module 2176, or the communication module 2190) among the components of the electronic device 2101, instead of the main processor 2121 while the main processor 2121 is in an inactive (e.g., sleep) state, or together with the main processor 2121 while the main processor 2121 is in an active state (e.g., executing an application). According to an embodiment, the auxiliary processor 2123 (e.g., an image signal processor or a communication processor) may be implemented as part of another component (e.g., the camera module 2180 or the communication module 2190) functionally related to the auxiliary processor 2123. According to an embodiment, the auxiliary processor 2123 (e.g., the neural processing unit) may include a hardware structure specified for artificial intelligence model processing. An artificial intelligence model may be generated by machine learning. Such learning may be performed, e.g., by the electronic device 2101 where the artificial intelligence is performed or via a separate server (e.g., the server 2108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 2130 may store various data used by at least one component (e.g., the processor 2120 or the sensor module 2176) of the electronic device 2101. The various data may include, for example, software (e.g., the program 2140) and input data or output data for a command related thererto. The memory 2130 may include the volatile memory 2132 or the non-volatile memory 2134.

The program 2140 may be stored in the memory 2130 as software, and may include, for example, an operating system (OS) 2142, middleware 2144, or an application 2146.

The input module 2150 may receive a command or data to be used by another component (e.g., the processor 2120) of the electronic device 2101, from the outside (e.g., a user) of the electronic device 2101. The input module 2150 may include, for example, a microphone, a mouse, a keyboard, a key (e.g., a button), or a digital pen (e.g., a stylus pen).

The sound output module 2155 may output sound signals to the outside of the electronic device 2101. The sound output module 2155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 2160 may visually provide information to the outside (e.g., a user) of the electronic device 2101. The display module 2160 may include, for example, a display, a hologram device, or a projector and control circuitry to control a corresponding one of the display, hologram device, and projector. According to an embodiment, the display module 2160 may include a touch sensor adapted to detect a touch, or a pressure sensor adapted to measure the intensity of force incurred by the touch.

The audio module 2170 may convert a sound into an electrical signal and vice versa. According to an embodiment, the audio module 2170 may obtain the sound via the input module 2150, or output the sound via the sound output module 2155 or a headphone of an external electronic device (e.g., an electronic device 2102) directly (e.g., wiredly) or wirelessly coupled with the electronic device 2101.

The sensor module 2176 may detect an operational state (e.g., power or temperature) of the electronic device 2101 or an environmental state (e.g., a state of a user) external to the electronic device 2101, and then generate an electrical signal or data value corresponding to the detected state. According to an embodiment, the sensor module 2176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 2177 may support one or more specified protocols to be used for the electronic device 2101 to be coupled with the external electronic device (e.g., the electronic device 2102) directly (e.g., wiredly) or wirelessly. According to an embodiment, the interface 2177 may include, for example, a high definition multimedia interface (HDMI), a universal serial bus (USB) interface, a secure digital (SD) card interface, or an audio interface.

The connecting terminal 2178 may include a connector via which the electronic device 2101 may be physically connected with the external electronic device (e.g., the electronic device 2102). According to an embodiment, the connecting terminal 2178 may include, for example, a HDMI connector, a USB connector, a SD card connector, or an audio connector (e.g., a headphone connector).

The haptic module 2179 may convert an electrical signal into a mechanical stimulus (e.g., a vibration or a movement) or electrical stimulus which may be recognized by a user via his tactile sensation or kinesthetic sensation. According to an embodiment, the haptic module 2179 may include, for example, a motor, a piezoelectric element, or an electric stimulator.

The camera module 2180 may capture a still image or moving images. According to an embodiment, the camera module 2180 may include one or more lenses, image sensors, image signal processors, or flashes.

The power management module 2188 may manage power supplied to the electronic device 2101. According to one embodiment, the power management module 2188 may be implemented as at least part of, for example, a power management integrated circuit (PMIC).

The battery 2189 may supply power to at least one component of the electronic device 2101. According to an embodiment, the battery 2189 may include, for example, a primary cell which is not rechargeable, a secondary cell which is rechargeable, or a fuel cell.

The communication module 2190 may support establishing a direct (e.g., wired) communication channel or a wireless communication channel between the electronic device 2101 and the external electronic device (e.g., the electronic device 2102, the electronic device 2104, or the server 2108) and performing communication via the established communication channel. The communication module 2190 may include one or more communication processors that are operable independently from the processor 2120 (e.g., the application processor (AP)) and supports a direct (e.g., wired) communication or a wireless communication. According to an embodiment, the communication module 2190 may include a wireless communication module 2192 (e.g., a cellular communication module, a short-range wireless communication module, or a global navigation satellite system (GNSS) communication module) or a wired communication module 2194 (e.g., a local area network (LAN) communication module or a power line communication (PLC) module). A corresponding one of these communication modules may communicate with the external electronic device via the first network 2198 (e.g., a short-range communication network, such as Bluetooth™, wireless-fidelity (Wi-Fi) direct, or infrared data association (IrDA)) or the second network 2199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 2192 may identify and authenticate the electronic device 2101 in a communication network, such as the first network 2198 or the second network 2199, using subscriber information (e.g., international mobile subscriber identity (IMSI)) stored in the subscriber identification module 2196.

The wireless communication module 2192 may support a 5G network, after a 4G network, and next-generation communication technology, e.g., new radio (NR) access technology. The NR access technology may support enhanced mobile broadband (eMBB), massive machine type communications (mMTC), or ultrreliable and low-latency communications (URLLC). The wireless communication module 2192 may support a high-frequency band (e.g., the mmWave band) to achieve, e.g., a high data transmission rate. The wireless communication module 2192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 2192 may support various requirements specified in the electronic device 2101, an external electronic device (e.g., the electronic device 2104), or a network system (e.g., the second network 2199). According to an embodiment, the wireless communication module 2192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 2197 may transmit or receive a signal or power to or from the outside (e.g., the external electronic device) of the electronic device 2101. According to an embodiment, the antenna module 2197 may include an antenna including a radiating element composed of a conductive material or a conductive pattern formed in or on a substrate (e.g., a printed circuit board (PCB)). According to an embodiment, the antenna module 2197 may include a plurality of antennas (e.g., array antennas). In such a case, at least one antenna appropriate for a communication scheme used in the communication network, such as the first network 2198 or the second network 2199, may be selected, for example, by the communication module 2190 (e.g., the wireless communication module 2192) from the plurality of antennas. The signal or the power may then be transmitted or received between the communication module 2190 and the external electronic device via the selected at least one antenna. According to an embodiment, another component (e.g., a radio frequency integrated circuit (RFIC)) other than the radiating element may be additionally formed as part of the antenna module 2197.

According to various embodiments, the antenna module 2197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 2101 and the external electronic device 2104 via the server 2108 coupled with the second network 2199. Each of the electronic devices 2102 or 2104 may be a device of a same type as, or a different type, from the electronic device 2101. According to an embodiment, all or some of operations to be executed at the electronic device 2101 may be executed at one or more of the external electronic devices 2102, 2104, or 2108. For example, if the electronic device 2101 should perform a function or a service automatically, or in response to a request from a user or another device, the electronic device 2101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 2101. The electronic device 2101 may provide the outcome, with or without further processing of the outcome, as at least part of a reply to the request. To that end, a cloud computing, distributed computing, mobile edge computing (MEC), or client-server computing technology may be used, for example. The electronic device 2101 may provide ultra low-latency services using, e.g., distributed computing or mobile edge computing. In another embodiment, the external electronic device 2104 may include an internet-of-things (IoT) device. The server 2108 may be an intelligent server using machine learning and/or a neural network. According to an embodiment, the external electronic device 2104 or the server 2108 may be included in the second network 2199. The electronic device 2101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 2140) including one or more instructions that are stored in a storage medium (e.g., internal memory 2136 or external memory 2138) that is readable by a machine (e.g., the electronic device 2101). For example, a processor (e.g., the processor 2120) of the machine (e.g., the electronic device 2101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. wherein term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added. As described above, an electronic device (for example, the electronic device 110 of FIG. 1) according to an embodiment may include: a communication circuit (for example, the communication circuit 112 of FIG. 1) configured to transmit or receive a signal; a memory (for example, the memory 111 of FIG. 1) configured to store instructions; and at least one processor (for example, the processor 113 of FIG. 1) operatively connected with the communication circuit and the memory, and the at least one processor may generate a public key regarding a user of the electronic device and a blockchain address by executing the instructions, may determine an external electronic device to share data, may transmit, to the external electronic device through the communication circuit, an invitation message including information regarding the public key and the blockchain address, based on a response message of the external electronic device accessing through the invitation message, may generate a blockchain network including the external electronic device as a node; and may store information regarding the blockchain network in an external server.

According to an embodiment, the invitation message may include a uniform resource locator (URL), and the URL may further include signature data which is obtained by performing an electronic signature based on a private key of a user of the electronic device.

According to an embodiment, the least one processor may generate a first attestation key by executing the instructions, and may perform an electronic signature on the URL based on the first attestation key, and the URL transmitted to the external electronic device may further include signature data which is generated through the electronic signature performed based on the first attestation key.

According to an embodiment, the response message may include a second attestation key, and the at least one processor may examine validity of the external electronic device based on the second attestation key.

According to an embodiment, the at least one processor may generate a synchronized block within the blockchain network, and may record first transaction data including information regarding a user of the external electronic device on the block.

According to an embodiment, the first transaction data may include identification information regarding the user of the external electronic device, a blockchain address regarding the user of the external electronic device, a public key of the user of the external electronic device, and signature data which is signed based on the public key of the user of the external electronic device.

According to an embodiment, the at least one processor may record second transaction data including information regarding data to be shared with the external electronic device on the block by using the communication circuit.

In an embodiment, the information regarding the data to be shared with the external electronic device may include an authority to read the shared data, a shared data reading period (or a data sharing permitted period), and an authority to transmit the shared data.

In an embodiment, the at least one processor may receive a user input of changing an authority regarding the shared data through the second transaction data, and, in response to the user input, may record third transaction data to change the authority regarding the data on the block.

According to an embodiment, a ledger of the block may include world state data that is accessible by the electronic device and the external electronic device, and the at least one processor may modify the world state data based on execution of a smart contract regarding the block.

In an embodiment, the at least one processor may receive the response message, which is encrypted with the public key, from the external electronic device by using the communication circuit.

According to an embodiment, the at least one processor may execute the instructions and may decrypt the response message by using a private key of the user of the electronic device.

In an embodiment, the electronic device may further include a display (for example, the display 114 of FIG. 1) operatively connected with the at least one processor, and the at least one processor may control the display to display a file list including a file including data to be shared with the external electronic device, may receive a user input of selecting the file from the file list, may control the display to display a sharing means list including at least one sharing method, in response to a user input of selecting a designated sharing method in the sharing means list, may control the display to display a participant list including user identification information regarding a user of the external electronic device, in response to a use input of selecting the user identification information from the participant list, may control the display to display a screen including the invitation message; and, in response to a user input on the screen including the invitation message, may control the communication circuit to transmit a message including a URL to the external electronic device.

In an embodiment, the at least one processor may identify whether the blockchain network including the external electronic device as a node is generated; and may share data through the blockchain network.

According to an embodiment, an operating method of the electronic device 110 may include: generating a public key regarding a user of the electronic device and a blockchain address by executing instructions; determining an external electronic device to share data; transmitting, to the external electronic device, an invitation message including information regarding the public key and the blockchain address; based on a response message of the external electronic device accessing through the invitation message, generating a blockchain network including the external electronic device as a node; and storing information regarding the blockchain network in an external server.

In an embodiment, the invitation message may include a URL, the operating method of the electronic device may further include: generating a first attestation key by executing the instructions; and performing an electronic signature on the URL based on the first attestation key, and the URL may include signature data which is obtained by performing an electronic signature based on a private key of a user, and signature data which is generated through the electronic signature performed based on the first attestation key.

According to an embodiment, the response message may include a second attestation key, and the method may further include examining validity of the external electronic device based on the second attestation key.

According to an embodiment, the operating method of the electronic device 110 may further include: generating a synchronized block within the blockchain network; and recording first transaction data including information regarding a user of the external electronic device on the block.

In an embodiment, the operating method of the electronic device 110 may further include recording second transaction data including information regarding data to be shared with the external electronic device on the block.

According to an embodiment, the operating method of the electronic device 110 may further include: receiving a user input of changing an authority regarding the shared data through the second transaction data; and, in response to the user input, recording third transaction data to change the authority regarding the data on the block.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 2140) including one or more instructions that are stored in a storage medium (e.g., internal memory 2136 or external memory 2138) that is readable by a machine (e.g., the electronic device 2101). For example, a processor (e.g., the processor 2120) of the machine (e.g., the electronic device 2101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
   communication circuitry;
   at least one processor comprising processing circuitry;
   memory storing instructions that, when executed by the at least one processor individually or collectively, cause the electronic device to:
   generate a public key regarding a first user of the electronic device and a blockchain address;
   determine an external electronic device to share data;
   transmit, to the external electronic device through the communication circuitry, an invitation message comprising information regarding the public key and the blockchain address;
   based on a response message, received from the external electronic device in response to the invitation message, generate a blockchain network comprising the external electronic device as a node; and
   store information regarding the blockchain network in an external server.

2. The electronic device of claim 1, wherein the invitation message comprises a uniform resource locator (URL), and
   wherein the URL further comprises first signature data which is obtained by performing an electronic signature based on a private key of the first user.

3. The electronic device of claim 2, wherein the instructions, when executed by the at least one processor individually or collectively, cause the electronic device to generate a first attestation key, and perform an electronic signature on the URL based on the first attestation key, and wherein the URL transmitted to the external electronic device further comprises second signature data which is generated through the electronic signature performed based on the first attestation key.

4. The electronic device of claim 3, wherein the response message comprises a second attestation key, and wherein the instructions, when executed by the at least one processor individually or collectively, cause the electronic device to determine a validity of the external electronic device based on the second attestation key.

5. The electronic device of claim 1, wherein the instructions, when executed by the at least one processor individually or collectively, cause the electronic device to:

generate a block that is synchronized within the blockchain network; and record, on the block, first transaction data comprising information regarding a second user of the external electronic device.

6. The electronic device of claim 5, wherein the first transaction data comprises identification information regarding the second user of the external electronic device, a blockchain address regarding the second user of the external electronic device, a public key of the second user of the external electronic device, and third signature data which is signed based on the public key of the second user.

7. The electronic device of claim 5, wherein the instructions, when executed by the at least one processor individually or collectively, cause the electronic device to record, on the block, second transaction data comprising information regarding data to be shared with the external electronic device.

8. The electronic device of claim 7, wherein the information regarding the data to be shared with the external electronic device comprises an authority to read shared data, a period in which reading of the shared data is allowed, and an authority to transmit the shared data.

9. The electronic device of claim 7, wherein the instructions, when executed by the at least one processor individually or collectively, cause the electronic device to:

receive a user input of changing an authority regarding shared data; and record, on the block based on the user input, third transaction data to change the authority regarding the data on the block.

10. The electronic device of claim 5, wherein a ledger of the block comprises world state data that is accessible by the electronic device and the external electronic device, and wherein the instructions, when executed by the at least one processor individually or collectively, cause the electronic device to modify the world state data based on execution of a smart contract regarding the block.

11. The electronic device of claim 1, wherein the instructions, when executed by the at least one processor individually or collectively, cause the electronic device to receive, from the external electronic device via the communication circuitry, the response message which is encrypted with the public key.

12. The electronic device of claim 11, wherein the instructions, when executed by the at least one processor individually or collectively, cause the electronic device to decrypt the response message by using a private key of the first user of the electronic device.

13. The electronic device of claim 1, further comprising a display, wherein the instructions, when executed by the at least one processor individually or collectively, cause the electronic device to:

control the display to display a file list comprising a file, the file comprising data to be shared with the external electronic device;

receive a user input of selecting the file from the file list;

control the display to display a sharing method list comprising at least one sharing method;

based on a user input of selecting a sharing method from the sharing method list, control the display to display a screen comprising the invitation message; and based on a user input on the screen comprising the invitation message, control the communication circuitry to transmit the invitation message to the external electronic device.

14. The electronic device of claim 1, wherein the instructions, when executed by the at least one processor individually or collectively, cause the electronic device to, based on identifying that the blockchain network comprising the external electronic device as the node is generated, share data with the external electronic device through the blockchain network.

15. A method of operating an electronic device, the method comprising:

generating a public key regarding a first user of the electronic device and a blockchain address;

determining an external electronic device to share data;

transmitting, to the external electronic device, an invitation message comprising information regarding the public key and the blockchain address;

based on a response message, received from the external electronic device in response to the invitation message, generating a blockchain network comprising the external electronic device as a node; and storing information regarding the blockchain network in an external server.

16. The method of claim 15, wherein the invitation message comprises a URL, and the method further comprises:

generating a first attestation key and performing an electronic signature on the URL based on the first attestation key, and wherein the URL comprises first signature data which is obtained by performing an electronic signature based on a private key of the first user, and second signature data which is generated through the electronic signature performed based on the first attestation key.

17. The method of claim 16, wherein the response message comprises a second attestation key, and the method further comprising:

determining a validity of the external electronic device based on the second attestation key.

18. The method of claim 15, further comprising:

generating a block that is synchronized within the blockchain network; and recording, on the block, first transaction data comprising information regarding a second user of the external electronic device.

19. The method of claim 18, further comprising recording, on the block, second transaction data comprising information regarding data to be shared with the external electronic device.

20. The method of claim 19, further comprising:
receiving a user input of changing an authority regarding shared data; and
recording, on the block based on the user input, third transaction data to change the authority regarding the data.

* * * * *